(12) United States Patent
Chevillard et al.

(10) Patent No.: US 10,982,441 B2
(45) Date of Patent: Apr. 20, 2021

(54) MULTIPLE LAYER SUBSTRATE FOR ROOFING MATERIALS

(71) Applicant: TAMKO Building Products, LLC, Galena, KS (US)

(72) Inventors: Cyril Chevillard, Carl Junction, MO (US); Aaron R. Phillips, Baxter Springs, KS (US); James Gregory Powell, Reeds, MO (US)

(73) Assignee: TAMKO Building Products, LLC, Galena, KS (US)

( * ) Notice: Subject to any disclaimer, the term of this patent is extended or adjusted under 35 U.S.C. 154(b) by 0 days.

(21) Appl. No.: 16/290,874

(22) Filed: Mar. 2, 2019

(65) Prior Publication Data
US 2019/0277028 A1 Sep. 12, 2019

Related U.S. Application Data

(60) Provisional application No. 62/641,102, filed on Mar. 9, 2018.

(51) Int. Cl.
*E04C 1/40* (2006.01)
*E04B 5/00* (2006.01)

(52) U.S. Cl.
CPC .................. *E04C 1/40* (2013.01); *E04C 1/24* (2013.01); *B32B 2250/03* (2013.01); *B32B 2255/02* (2013.01); *B32B 2395/00* (2013.01); *B32B 2419/06* (2013.01)

(58) Field of Classification Search
CPC ..................................... E04C 1/40; E04C 1/24
See application file for complete search history.

(56) References Cited

U.S. PATENT DOCUMENTS

| | | | |
|---|---|---|---|
| 3,614,936 A | 10/1971 | Phillips | |
| 4,230,762 A | 10/1980 | Iwasaki et al. | |
| 4,287,248 A | 9/1981 | Gessner et al. | |
| 4,578,307 A | 3/1986 | Niki et al. | |
| 4,692,375 A | 9/1987 | Neubauer et al. | |

(Continued)

FOREIGN PATENT DOCUMENTS

| | | |
|---|---|---|
| DE | 2948235 A1 | 6/1980 |
| EP | 0221336 A2 | 5/1967 |

(Continued)

OTHER PUBLICATIONS

CFS Fibreglass; "Fiberglass Guide" NPL-1 (Link—https://www.cfsnet.co.uk/acatalog/Web_FibreglassGuide.pdf).

*Primary Examiner* — Babajide A Demuren
(74) *Attorney, Agent, or Firm* — Cochran Freund & Young LLC; William W. Cochran

(57) ABSTRACT

Disclosed is a multiple layer substrate that can be used with a top asphalt applicator that eliminates the need for a bottom asphalt applicator and fines applied to the bottom asphalt layer. A low porosity or impermeable bottom layer prevents the flow of asphalt applied to the porous top layers of the substrate from penetrating the bottom surface. This eliminates the need for fines to prevent sticking of shingles in a shingle stack. In addition, substrate layers that combine fiberglass and polyester fibers in various configurations provide a substrate that can be used in typical shingle manufacturing and manufacturing of waterproofing products that is impact resistant.

21 Claims, 24 Drawing Sheets

(56) References Cited

U.S. PATENT DOCUMENTS

| | | | |
|---|---|---|---|
| 4,755,423 A | 7/1988 | Greiser et al. | |
| 4,804,696 A | 2/1989 | Jolitz et al. | |
| RE33,023 E | 8/1989 | Hiers | |
| 4,892,780 A | 1/1990 | Cochran et al. | |
| 5,017,426 A | 5/1991 | Greiser et al. | |
| 5,026,747 A | 6/1991 | Jolitz et al. | |
| 5,102,436 A | 4/1992 | Grabowski | |
| 5,108,831 A * | 4/1992 | Green | B32B 5/26 442/24 |
| 5,129,131 A | 7/1992 | Kimura et al. | |
| 5,171,629 A | 12/1992 | Heidel et al. | |
| 5,229,184 A | 7/1993 | Campbell et al. | |
| 5,458,960 A | 10/1995 | Nieminen et al. | |
| 5,571,596 A | 11/1996 | Johnson | |
| 5,616,395 A | 4/1997 | Baravian et al. | |
| 5,830,548 A | 11/1998 | Andersen et al. | |
| 6,207,593 B1 | 3/2001 | Fields | |
| 6,228,785 B1 | 5/2001 | Miller et al. | |
| 6,235,657 B1 | 5/2001 | Schöps et al. | |
| 6,709,994 B2 | 3/2004 | Miller et al. | |
| 7,048,990 B2 | 5/2006 | Koschitzky | |
| 7,148,160 B2 | 12/2006 | Porter | |
| 7,169,719 B2 | 1/2007 | Mehta et al. | |
| 7,179,761 B2 * | 2/2007 | Malik | B32B 11/04 442/20 |
| 7,199,065 B1 | 4/2007 | Groh et al. | |
| 7,351,673 B1 | 4/2008 | Groh et al. | |
| 7,442,658 B2 | 10/2008 | Rodriques et al. | |
| 7,494,558 B2 | 2/2009 | Lehnert et al. | |
| 7,670,668 B2 | 3/2010 | Greaves et al. | |
| 7,786,028 B2 | 8/2010 | Souther et al. | |
| 7,836,654 B2 | 11/2010 | Belt et al. | |
| 8,105,965 B2 * | 1/2012 | Zhang | E04D 5/10 442/398 |
| 8,226,790 B2 | 7/2012 | Rodriques et al. | |
| 8,231,443 B1 | 7/2012 | Tomcak et al. | |
| 8,240,102 B2 | 8/2012 | Belt et al. | |
| 8,623,164 B2 | 1/2014 | Belt et al. | |
| 8,802,215 B2 | 8/2014 | Kalkanoglu et al. | |
| 8,999,868 B2 | 4/2015 | Rosé et al. | |
| 9,010,058 B2 | 4/2015 | DeJarnette et al. | |
| 9,132,607 B2 * | 9/2015 | Kasuga | B32B 5/245 |
| 9,242,432 B1 | 1/2016 | Harrington, Jr. et al. | |
| 9,259,860 B2 * | 2/2016 | Kalkanoglu | B29B 17/00 |
| 9,309,611 B2 | 4/2016 | Migliavacca | |
| 9,441,140 B2 | 9/2016 | Zhou et al. | |
| 9,447,581 B2 | 9/2016 | Harrington et al. | |
| 9,580,902 B2 | 2/2017 | Kalkanoglu et al. | |
| 9,605,434 B2 | 3/2017 | Belt et al. | |
| 9,677,277 B2 * | 6/2017 | Kalkanoglu | E04D 5/10 |
| 10,112,367 B2 * | 10/2018 | Shen | B32B 11/046 |
| 10,259,199 B2 * | 4/2019 | Beuchel | B32B 21/08 |
| 10,710,334 B2 * | 7/2020 | Shen | B32B 7/04 |
| 2002/0160151 A1 * | 10/2002 | Pinault | B32B 11/04 428/144 |
| 2004/0009319 A1 * | 1/2004 | Zanchetta | B32B 11/046 428/40.1 |
| 2004/0148887 A1 * | 8/2004 | Di Pede | E04D 5/10 52/408 |
| 2006/0201610 A1 * | 9/2006 | Bartek | E04D 5/10 156/192 |
| 2008/0026663 A1 * | 1/2008 | Zhang | B32B 11/04 442/398 |
| 2008/0207833 A1 | 8/2008 | Bear et al. | |
| 2014/0272244 A1 | 9/2014 | Harrington, Jr. et al. | |
| 2015/0086747 A1 * | 3/2015 | Beuchel | B32B 7/02 428/106 |
| 2015/0218823 A1 | 8/2015 | Shiao et al. | |
| 2015/0240494 A1 | 8/2015 | Kiik et al. | |
| 2017/0067257 A1 | 3/2017 | Zhou et al. | |
| 2017/0158440 A1 | 6/2017 | Belt et al. | |
| 2017/0341272 A1 | 11/2017 | Vogt et al. | |
| 2018/0134002 A1 | 5/2018 | Brahms et al. | |

FOREIGN PATENT DOCUMENTS

| | | |
|---|---|---|
| WO | 0108862 A2 | 2/2001 |
| WO | 2003097726 A1 | 11/2003 |

* cited by examiner

MULTIPLE LAYER SUBSTRATE FOR ROOFING MATERIALS

CROSS-REFERENCE TO RELATED APPLICATION

This Non-Provisional patent application claims the benefit of the Provisional U.S. Patent Application No. 62/641,102, entitled "Multiple Layer Substrate for Roofing Materials," which was filed with the U.S. Patent & Trademark Office on Mar. 9, 2018, which is specifically incorporated herein by reference for all that it discloses and teaches.

BACKGROUND OF THE INVENTION

Asphalt roofing provides inexpensive and effective protection of roofs. Asphalt roofing typically comprises a substrate material that is coated with asphalt. Granules or other materials can be used to provide aesthetics to the roofing material and increase protection of the asphalt roofing. Consequently, modern asphalt roofing has provided a reliable, aesthetic and inexpensive product for protecting roofs and repelling moisture.

SUMMARY OF THE INVENTION

An embodiment of the present invention may therefore comprise a multiple layer sheet of substrate material for use in asphalt waterproofing products comprising: a first sheet of substrate material having a first porosity; a second sheet of substrate material having a second porosity that is less than the first porosity; a bonding agent that bonds the first sheet and the second sheet to form the multiple layer sheet of substrate material.

An embodiment of the present invention may further comprise a multi-layer substrate for asphalt waterproofing products comprising: a polymer filament web; a fiberglass mat having fiberglass threads that are entangled with the polymer filament web, the fiberglass mat being thermally bonded to the polymer filament web.

An embodiment of the present invention may further comprise a method of making a multiple porosity substrate for an asphalt waterproofing product comprising: supplying a low porosity or impermeable sheet of substrate material to a manufacturing line for manufacturing the multiple porosity substrate; applying a bonding agent to the low porosity or impermeable sheet of substrate material; supplying a semi-porous or porous sheet of substrate material to the manufacturing line so that the semi-porous or porous sheet of substrate material is aligned with the low porosity or impermeable sheet of substrate material to form multiple layer sheets of substrate material having different porosities; causing the bonding agent to bond the low porosity or impermeable sheet with the semi-porous or porous sheet of substrate material.

An embodiment of the present invention may further comprise a method of making a multiple layer sheet of substrate material for asphalt waterproofing products comprising: supplying a first sheet of substrate material having a first porosity to a manufacturing line for manufacturing the multiple layer sheet of substrate material; applying a bonding agent; supplying a second sheet of substrate material having a second porosity that is less than the first porosity to the manufacturing line; aligning the second sheet of substrate material with the first sheet to form a multi-layer composite of substrate material; causing the bonding agent to bond the first sheet of substrate material to the second sheet of substrate material to create the multiple layer sheet of substrate material.

An embodiment of the present invention may further comprise a method of making a multiple layer composite sheet of substrate material for asphalt waterproofing products comprising: supplying a polymer filament web to a manufacturing line for manufacturing the multiple layer composite sheet of substrate material; supplying a fiberglass mat to the manufacturing line; aligning the polymer filament web with the fiberglass mat; entangling the polymer filament web with the fiberglass mat to form an entangled polymer filament web and fiberglass mat composite; feeding the entangled polymer filament web and fiberglass mat composite through heated calender rollers to form the multiple layer sheet of substrate material.

An embodiment of the present invention may further comprise a system for making a multi-layer substrate for waterproofing products comprising: a polymer filament supply roll that supplies a polymer filament web to the system; a fiberglass mat supply roll that supplies a fiberglass mat to the system; an entanglement device that entangles the polymer filament web and the fiberglass mat to create an entangled polymer filament web and fiberglass mat; heated calender rollers that heat and compress the entangled polymer filament web and the fiberglass mat to create the multi-layer substrate for asphalt roofing.

An embodiment of the present invention may further comprise a system for making a multi-layer substrate for waterproofing products comprising: a fiberglass mat supply roll that supplies a fiberglass mat to the system; a web formation belt disposed under the fiberglass mat; a polyester filament dispenser that dispenses polyester filaments on the fiberglass mat over the web formation belt; an entanglement device that entangles the polyester filaments and fiberglass fibers to form an entangled polyester and fiberglass composite; heated calender rollers that heat and compress the entangled polyester and fiberglass composite to form the multi-layer substrate.

An embodiment of the present invention may further comprise a waterproofing material that is impact resistant comprising: a first layer of substrate material having a first porosity; a second layer of substrate material having a second porosity that is less than the first porosity; a first layer of asphalt that is attached to the first layer of substrate material; a second layer of asphalt that is attached to the first layer of substrate material and the second layer of substrate material.

An embodiment of the present invention may further comprise waterproofing material that is impact resistant comprising: a first layer of substrate material that is liquid impermeable; a second layer of substrate material that is porous to liquid asphalt; a liquid asphalt that is disposed on the second layer of substrate material so that the liquid asphalt penetrates the second layer of substrate material and is allowed to cool to form a layer of asphalt that is attached to the second layer of substrate material and the first layer of substrate material.

DETAILED DESCRIPTION OF THE EMBODIMENTS

Figure 1A:
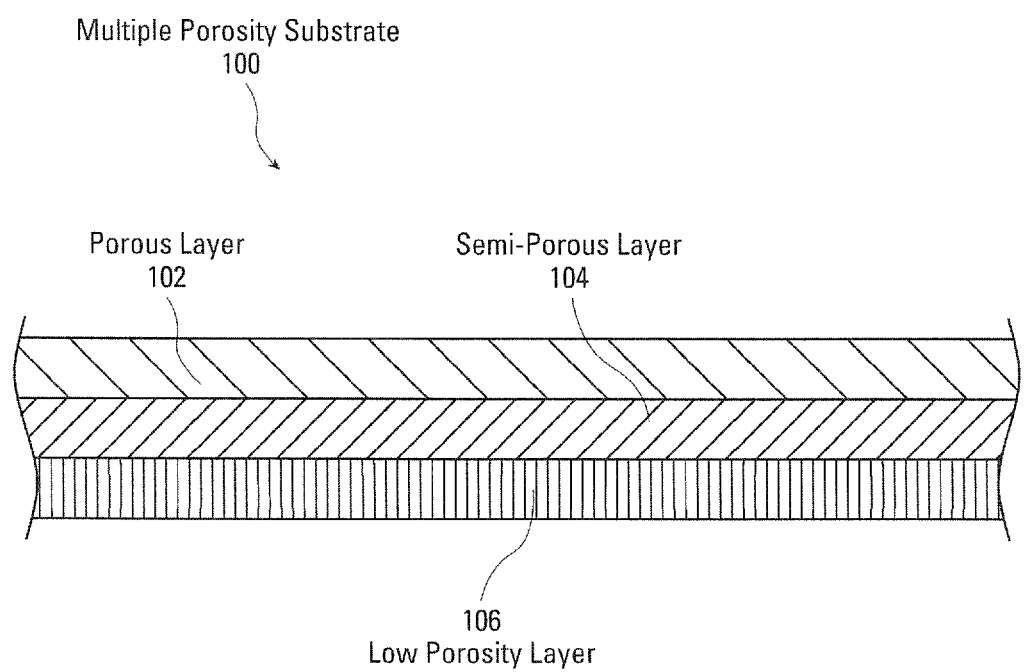
FIG. 1A is a sectional view of an embodiment of a multiple porosity substrate for asphalt roofing materials.

FIG. 1A is a schematic cross-sectional view of a multiple porosity substrate 100 that constitutes an embodiment of the present invention. The term "multiple" as used herein means "more than one," "differential" or "varying." As illustrated in FIG. 1A, the substrate 100 has a porous layer 102 on the top surface of the substrate 100, a semi-porous layer 104 in the center portion of the substrate 100 and a low porosity layer 106 on the bottom portion of the substrate 100. Asphalt roofing materials typically have a top asphalt layer and a bottom asphalt layer that are applied over the top and bottom surfaces of the substrate. The substrate material typically has a uniform porosity throughout its thickness. For example, organic felt substrates, fibrous substrates, fiberglass substrates, polyester substrates and other polymer-based substrates such as polypropylene and polyethylene, are formed in layers or webs that have a uniform porosity throughout their thickness. The layers or webs absorb and/or are impregnated with asphalt which flows into the porous openings in layers or webs that is applied to both the top and bottom of the substrate material. In this manner, the asphalt soaks into the porous substrate layers and adheres to the substrate layers when the asphalt cools. The asphalt is not absorbed by the material itself in the porous layer, but is absorbed by the asphalt flowing into the interstitial openings in the layers of material. The substrate provides a structural integrity to the asphalt layers applied to both the top and bottom of the substrate. The term "asphalt" as used herein includes modified asphalts that have been modified with a variety of additives, including, but not limited to, polymer additives, waxes, oils, etc., and fillers such as limestone. In that regard, U.S. Pat. No. 9,637,664, issued May 2, 2017 to TAMKO Building Products, Inc. entitled "Asphalt Upgrading without Oxidation," is specifically incorporated herein by reference for all that it discloses and teaches. The term "polyester," as used herein to describe the invention, should be considered to be only one example of the various synthetic and polymer-based substrates that can be used in accordance with the present invention. The various polyester filaments and polyester webs may comprise any polymer-based material, including polymer fibers, nonwoven polymer mats, woven polymer mats and polymer fibers made of polypropylene, polyethylene and similar synthetic polymers. The term "waterproofing products" includes or comprises roofing shingles, roll roofing, waterproof membranes that can be used either above ground or below ground, or other similar applications. The term "continuous" refers to the substantially continuous nature of some of the polymer fibers and fiberglass threads, as well as other materials, such as fabric threads that may be utilized to create the composite substrates disclosed herein. Fabric is woven or nonwoven cloth of organic or inorganic filaments, threads or yarns. Polymer fibers may be extruded using a spinneret and delivered to a disperser, which places the "continuous" polymer fibers in a manner that creates a layer of fibers. Random interruption in the filament formation process may occur from time to time, which temporarily disrupts the continuous nature of the filaments extruded by the spinneret. The interruption varies depending upon the particular day and operating conditions. In other words, the polymer filaments rarely break and, in that regard, are considered to be "continuous." However, breaks and disruptions in the polymer filaments, as well as fiberglass threads and fabric threads, may occur, but are still considered to be "continuous" even though the nature of these fibers and threads is substantially continuous. This is more fully disclosed in U.S. Provisional Patent Application No. 62/808,059 filed Feb. 20, 2019, entitled "Continuous Nonwoven Polyester Fiber and Fiberglass Thread Hybrid Mat," which is specifically incorporated herein by reference for all that it discloses and teaches. The bottom layer of asphalt also provides a waterproof seal to the bottom of the porous substrate layer so that any water that is proximate to the bottom side of the shingle is not absorbed by the substrate layer. Since asphalt is applied to the bottom or back layer of a typical roofing material, fines are applied to that asphalt, such as sand, finely ground limestone or other typical fines materials. These fines that are applied to the back or bottom layer of the asphalt prevent the roofing material from sticking to other roofing material, such as shingles in a shingle pack, roll roofing in a roll, etc.

The multiple porosity substrate 100 illustrated in FIG. 1A allows for application of asphalt on only the top surface, which is absorbed by the porous layer 102, the semi-porous layer 104 and portions of the low porosity layer 106. In this manner, only a top layer of asphalt is necessary to provide roofing material that is sealed on both the top and bottom portions of the multiple porosity substrate 100. The asphalt layer applied to the top surface of the multiple porosity substrate 100 seals the top surface. Since the asphalt applied to the top layer flows into the interstitial openings in the low porosity layer 106, water is prevented from being absorbed into the low porosity layer 106 and the low porosity layer or water impervious layer 106 prevents water from penetrating a non-porous layer 106. In this manner, asphalt only needs to be applied to the top surface and does not penetrate through the multiple porosity substrate 100 so that fines or other protectant material do not have to be applied to the back surface of the multiple porosity substrate 100.

Figure 1B:
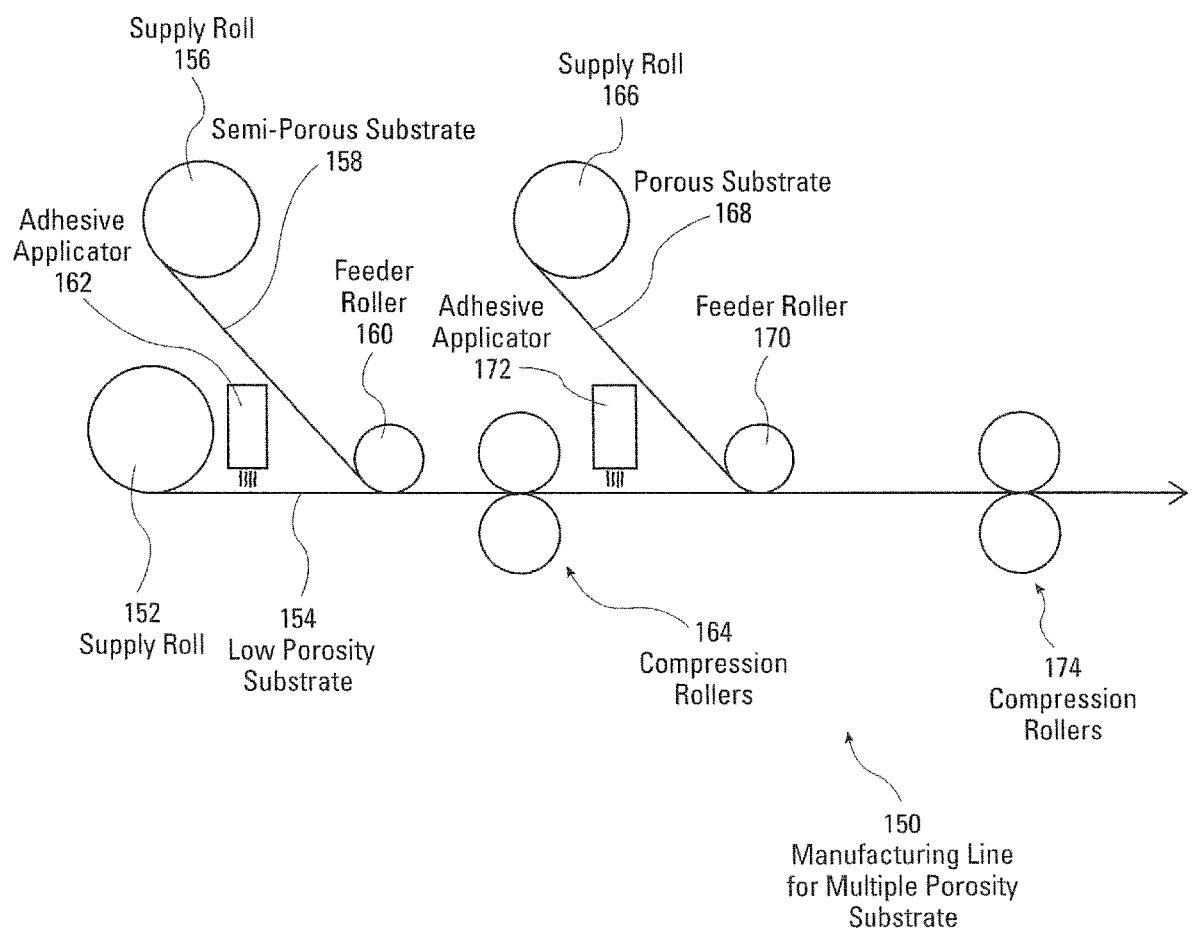
FIG. 1B is a schematic side illustration of a manufacturing line for manufacturing a multiple porosity substrate.

FIG. 1B is a schematic side illustration of a manufacturing line 150 for manufacturing a multiple porosity substrate. Although FIG. 1A and FIG. 1B both show a three-layer substrate, any number of layers of different porosity substrate materials can be used. As illustrated in FIG. 1B, a supply roll 152 feeds a low porosity substrate 154 into the manufacturing line 150. An adhesive applicator 162 applies an adhesive or other bonding material to the low porosity or non-porous substrate 154. A supply roll 156 of semi-porous substrate 158 feeds the semi-porous substrate 158 to a feeder roller 160. The feeder roller 160 places the semi-porous substrate 158 over the low porosity or non-porous substrate 154. The layers of semi-porous substrate 158 and low porosity or non-porous substrate 154, with a bonding agent applied, are then fed through compression rollers 164. An adhesive applicator 172 applies an adhesive or bonding agent to the bonded layers of low porosity or non-porous substrate and semi-porous substrate 158. The bonded layers are then fed to feeder roller 170. A supply roll 166 of porous substrate 168 feeds the porous substrate material 168 to the feeder roller 170 which places the porous substrate 168 over the bonded two layers of semi-porous substrate 158 and low porosity substrate 154. The three layers then proceed to compression rollers 174. The compression rollers 174 bond the three layers of substrate material together. The substrate is then transmitted to remaining portions of the manufacturing line such as the top coat asphalt coater. Although FIG. 1B illustrates an example of a manufacturing line for a multiple porosity substrate 150, in which the low porosity or impervious substrate 154 is supplied to the system initially, and other layers are placed over the low porosity or impervious substrate 154, such as semi-porous substrate 158 and porous substrate 168, this process can be reversed or changed. For example, the porous substrate 168 may be initially fed into the system and the semi-porous substrate 158 can be deposited on the porous substrate 168, and then the low porosity or impervious substrate 154 can be deposited on the semi-porous substrate 158. In other words, the process illustrated in FIG. 1B can be inverted so that the various substrate materials are fed into the system in a different order. Of course, this is also true for the other manufacturing processes, such as those illustrated in FIG. 13, FIG. 14, FIG. 15, FIG. 16, FIG. 17, FIG. 18 and FIG. 19. With regard to FIG. 17, a supply roll of polyester web can be fed to the system and fiberglass threads can be deposited on the polyester web by a disperser.

Figure 2:
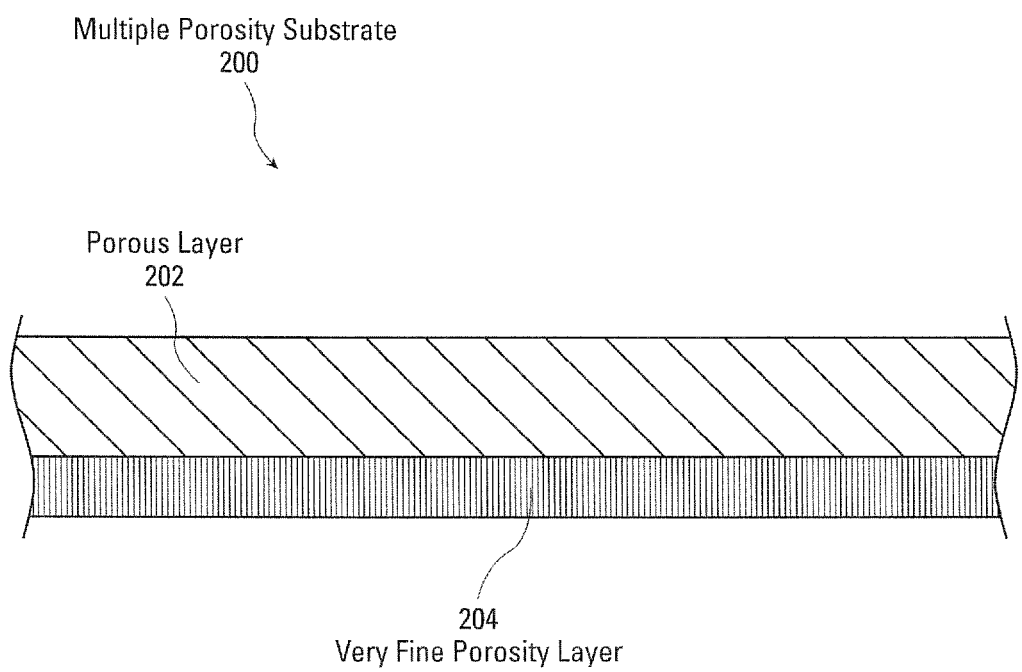
FIG. 2 is a cross-sectional schematic view of another embodiment of a multiple porosity substrate for an asphalt roofing product.

FIG. 2 is a schematic cross-sectional view of a two-layer substrate having different porosities. As illustrated in FIG. 2, a porous layer 202 is secured to a very fine or low porosity layer 204. The two layers can be bonded together using adhesives, heat bonding, chemical bonding or other techniques known in the art. An asphalt coater can then be used to apply asphalt to the porous layer 202. Alternatively, asphalt can be applied without the porous layer 202 being bonded to the very fine porous layer 204 since the asphalt may function to bind the layers.

Figure 3:
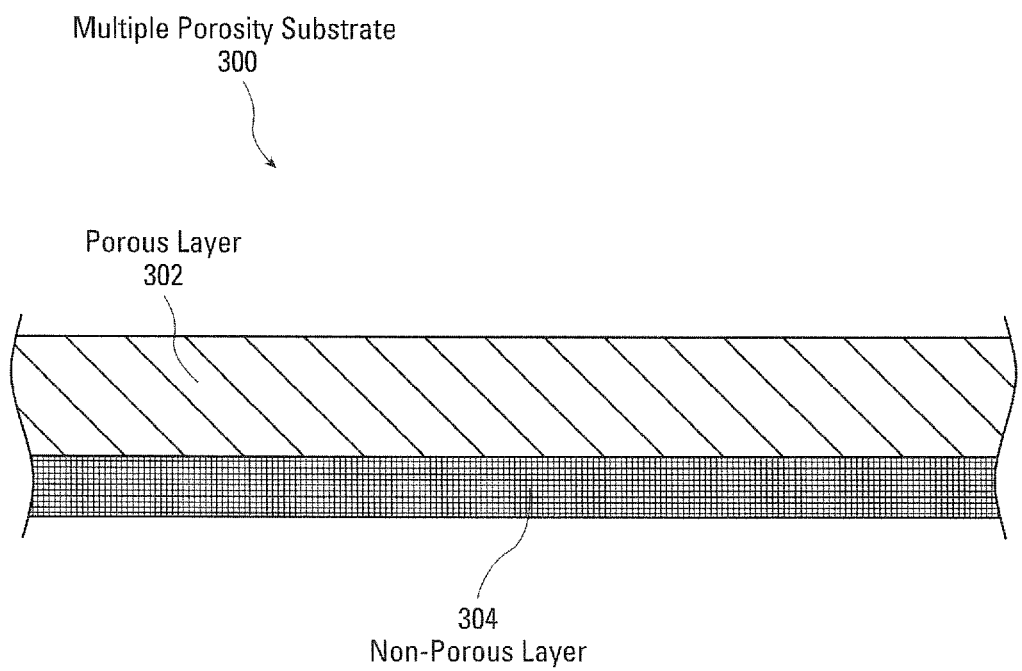
FIG. 3 is a cross-sectional schematic view of another embodiment of a multiple porosity substrate for an asphalt roofing product.

FIG. 3 illustrates a multiple porosity substrate 300. Multiple porosity substrate 300 has a porous layer 302 and a non-porous layer 304. The porous layer 302 can be bonded to the non-porous layer 304 using various methods including heat or the use of bonding agents. In addition, the application of asphalt on the porous layer 302 will cause the asphalt to flow through the porous layer 302 onto the non-porous layer 304. The asphalt will function as an adhesive bond which will bond the porous layer 302 to the non-porous layer 304. The advantage of the structure illustrated in FIG. 3 is that it is simple since it only has two layers and does not require application of asphalt on the bottom layer. The bottom non-porous layer 304 does not absorb moisture and does not require the application of fines to prevent sticking.

Figure 4:
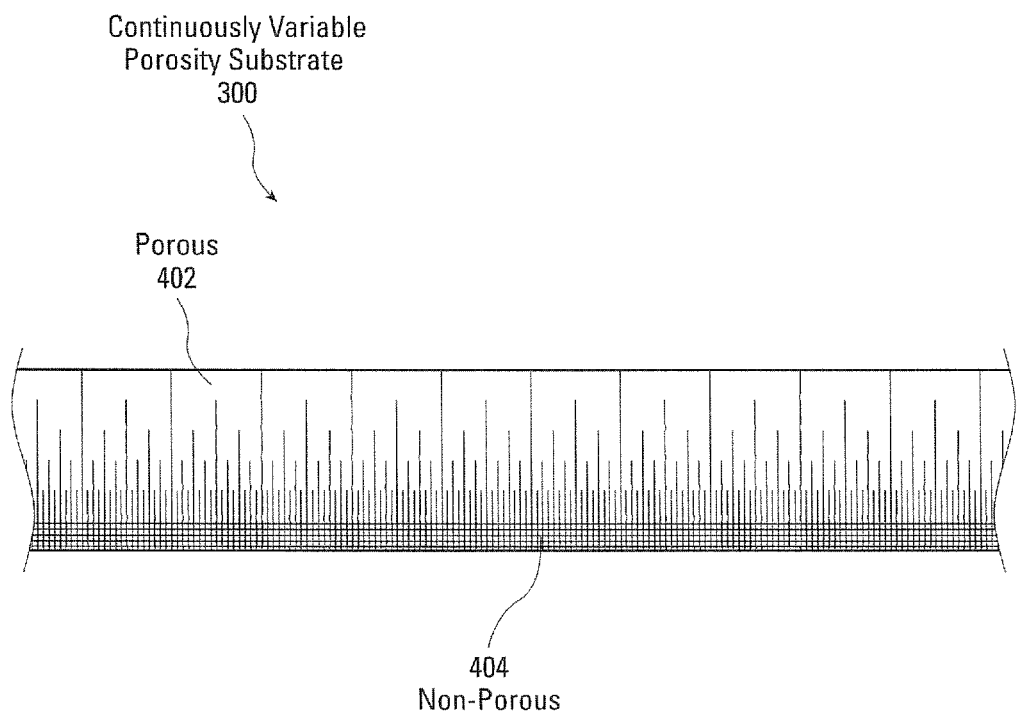
FIG. 4 is a cross-sectional schematic view of an embodiment of a continuously varying porosity substrate for an asphalt roofing product.

FIG. 4 is a schematic cross-sectional view of a continuously variable porosity substrate 400. As illustrated in FIG. 4, the substrate 400 is porous at the top surface 402 and non-porous at the bottom surface 404. In between, the porosity varies substantially continuously. The substrate 400 can be manufactured in various different ways including various weaving techniques with which fibers of plastic or cloth or other fibrous materials can be assembled. For example, very thin fibers can be utilized to create the non-porous surface 404 and the thickness of the fibers can increase towards the top porous surface 402. The fibers can be secured using various bonding methods including heat, chemical binding, and adhesives.

Figure 5:
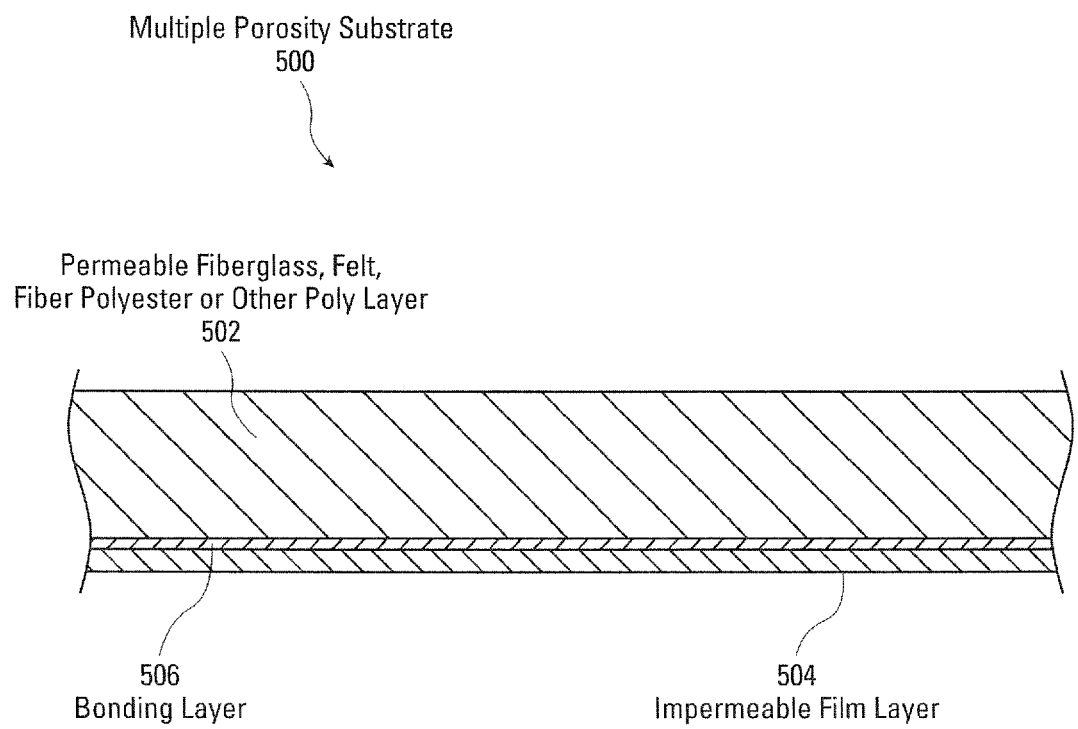
FIG. 5 is a cross-sectional schematic view of another embodiment of a multiple porosity substrate for an asphalt roofing product.

FIG. 5 is a cross-sectional view of a multiple porosity substrate 500. As illustrated in FIG. 5, a permeable fiberglass, felt, fiber, polyester, or other polymer layer 502 can be connected to an impermeable film layer 504. A bonding layer 506 can be utilized to bond the porous layer 502 to the impermeable film layer 504. Again, various bonding techniques can be used including heat bonding, chemical bonding, or adhesives utilizing standard techniques for securing a permeable layer 502 to the impermeable layer 504.

Figure 6:
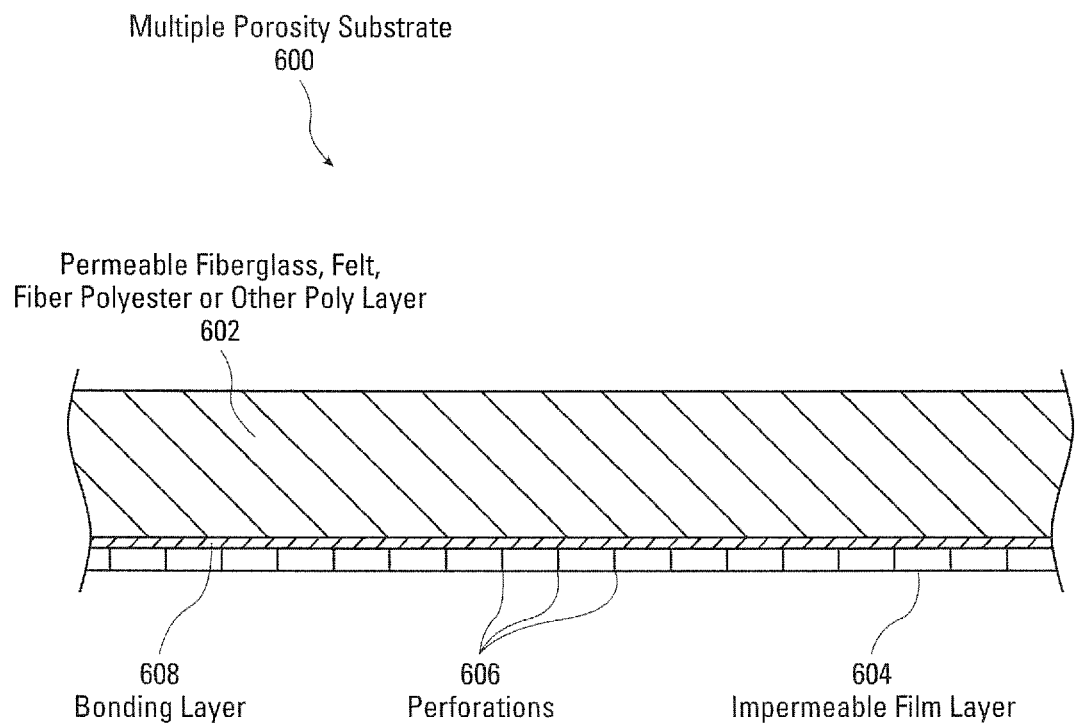
FIG. 6 is a cross-sectional schematic view of another embodiment of a multiple porosity substrate for an asphalt roofing product.

FIG. 6 is a schematic cross-sectional view of a multiple porosity substrate 600. The embodiment of FIG. 6 is similar to the embodiment of FIG. 5 in that a porous layer comprising a permeable fiberglass, felt, fiber, polyester, or other polymer layer 602 is secured to an impermeable film layer 604 with a bonding layer 608. The difference between the embodiments is that perforations 606 are formed in the impermeable film layer 604 which allows the asphalt that is applied to the permeable layer 602 to seep through the perforations 606. This further anchors the permeable layer 602 to the impermeable film layer 604.

Figure 7:
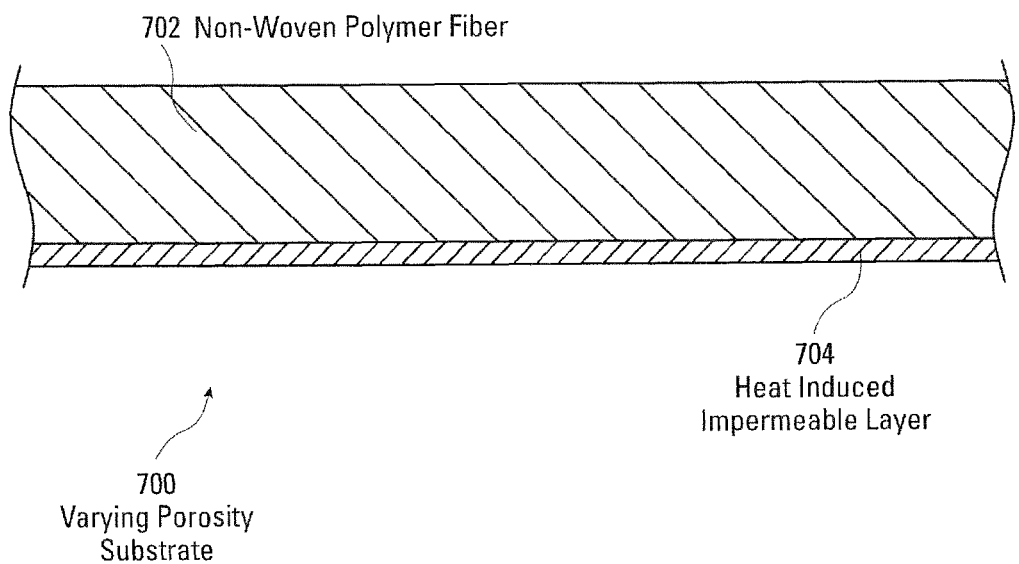
FIG. 7 is a cross-sectional schematic view of another embodiment of a multiple porosity substrate for an asphalt roofing product.

FIG. 7 is a schematic cross-sectional view of a multiple porosity substrate 700. As illustrated in FIG. 7, a non-woven polymer fiber 702 is connected to a heat induced impermeable layer 704. For example, the multiple porosity substrate 700 may be formed from non-woven polyester fibers that are heated on the bottom surface and that melt to create a heat induced impermeable layer 704. Other types of materials can be used to achieve this same result including polyester, polypropylene, polybutylene, polyimide, polycarbonate, polyamide, polyethylene, polystyrene, polyvinyl chloride, sulfone polymers, polyvinylidene chloride, which may be extruded into fibers or provided as a film, and various composite layers of these materials. Nylon and other synthetic fibers can also be used. Some synthetic polymer materials have low melting temperatures, which could result in softening or melting of the synthetic polymer material when immersed in a hot asphalt bath. The melting temperatures of the asphalt can be lowered through the use or inclusion of various waxes in the asphalt to lower the asphalt melting temperature. This is more fully disclosed in U.S. Pat. No. 9,637,664 issued May 2, 2017 to TAMKO Building Products, Inc., entitled "Asphalt Upgrading Without Oxidation," which is specifically incorporated herein by reference for all that it discloses and teaches. In accordance with that patent, various waxes, oils, polymers and other materials can be used to soften asphalt and lower the softening temperature of the asphalt. In addition, the manner in which the asphalt is applied to the substrate can also reduce the risk of melting the substrate. For example, most processes immerse the entire substrate in a bath of hot liquid asphalt so that both sides of the substrate are coated simultaneously. This method may tend to melt a substrate material that has a low melting temperature, since the immersion of the substrate into a liquid asphalt bath, which may be at a very high temperature, can tend to melt fibers made from polymers that have a low melting temperature. Alternatively, a temperature controlled asphalt can be sprayed onto the substrate and precise amounts of the asphalt can be deposited onto the substrate, which may lessen the tendency of the asphalt to melt a low melting temperature polymer. Other controlled methods can be used for applying the asphalt. For example, the substrate may be moved through a controlled flow curtain of asphalt and the dwell time adjusted for the substrate to control the amount of application of the asphalt to the substrate. Other techniques may also possibly be used, including extruders, roll applicators, including roll coating, kiss coating (inking coating), gravure coating or reverse roll coating, or using a knife/blade coater. In each of these processes, the amount of asphalt, as well as the total amount of heat that is applied to the substrate can be controlled, so as to prevent or minimize any melting of the polymer fibers.

Figure 8A:
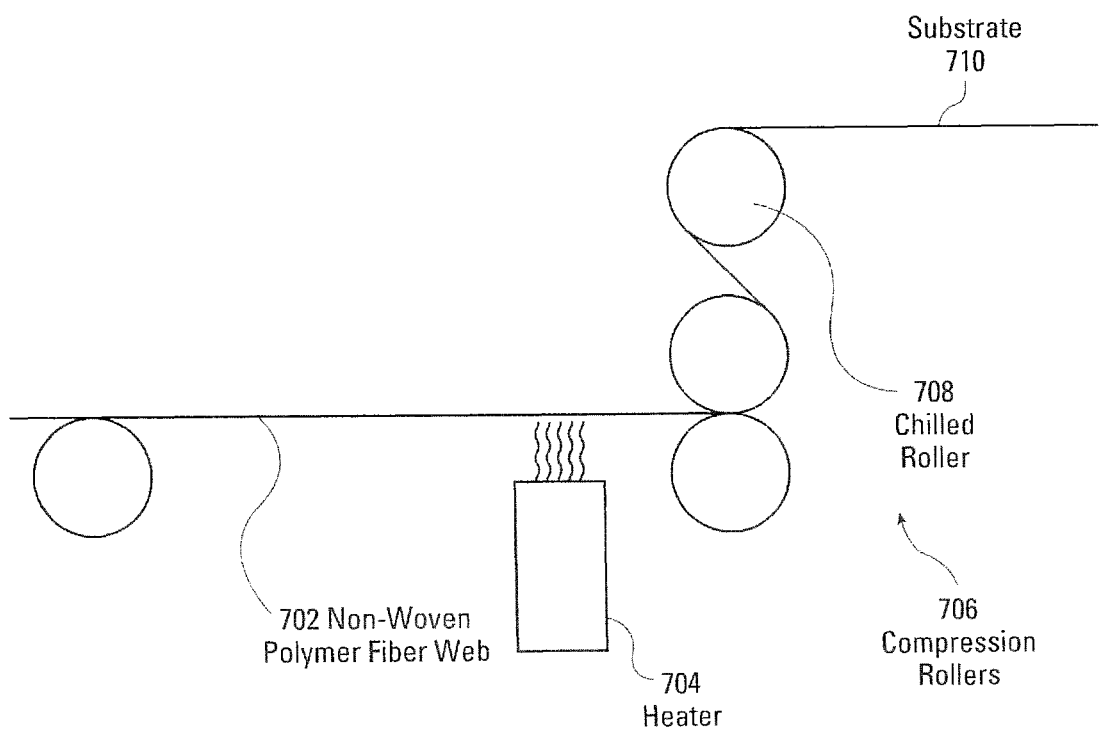
FIGS. 8A and 8B are schematic side views of a manufacturing line for implementing the embodiment of FIG. 7.

FIG. 8A is a schematic side view of a system for creating the substrate illustrated in the embodiment of FIG. 7. As shown in FIG. 8A non-woven polymer fiber sheet 702 is passed over a heater 704. The heater 704 is sufficiently hot to melt the lower surface of the polymer fiber material to create an impermeable layer such as a heat induced impermeable layer 704. The non-woven polymer fiber sheet 702 has a continuously constant speed so that heat applied by heater 704 is used to melt only the bottom surface of the substrate 700 to create the heat induced impermeable layer 704 at the bottom portion of the substrate 700. In that regard, the heat generated by heater 704 and the distance from the non-woven polyester sheet 702 to the heater 704 can be varied depending upon how fast the non-woven polymer fiber sheet 702 is moved over the heater 704, thereby altering the dwell time. After the heater 704 heats the bottom surface of the non-woven polymer fiber 702, the non-woven polymer fiber 702 passes through compression rollers 706 to ensure the heated portion of the polymer fibers is compressed. The non-woven polymer fiber web 702 is then passed over chilled roller 708 to cool the polyester fibers to form an impermeable layer on the bottom surface of the substrate 710.

Figure 8B:
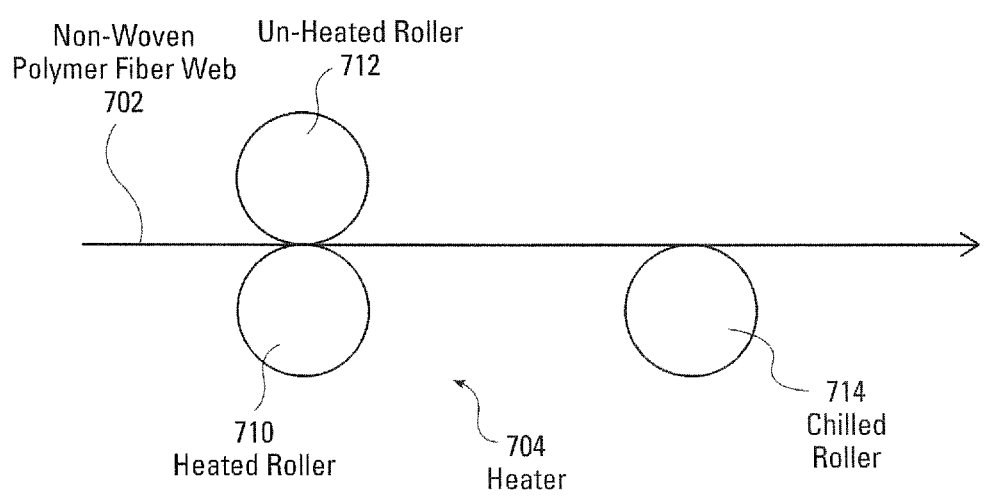

FIG. 8B is an alternative embodiment to that shown in FIG. 8A. A non-woven polymer fiber web 702 is passed through the heater 704, which comprises a heated roller 710 and an un-heated roller 712, which together, comprise calender rollers. The heated roller 710 softens the polymer fibers and compresses the softened polymer fibers against the un-heated roller 712 to form an impermeable layer at the bottom surface of the non-woven polymer fiber web 702. The web is then passed over a chilled roller 714 to cool the polymers in the polymer fiber web to form the impermeable layer.

Figure 9:
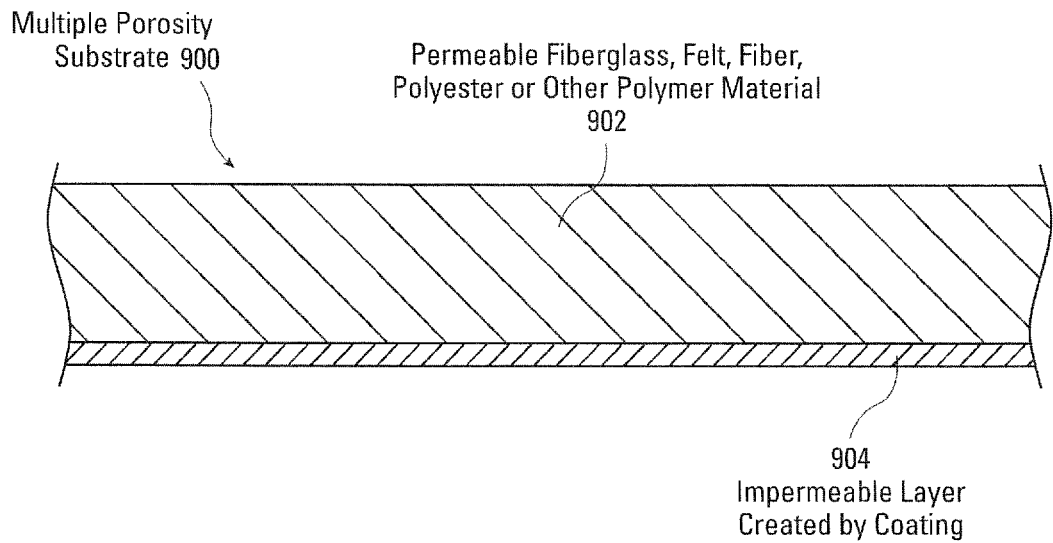
FIG. 9 is a schematic cross-sectional view of an embodiment of a roofing material that utilizes an impermeable layer created by a coating that is bonded to a permeable layer.

FIG. 9 is a side cross-sectional view of an embodiment of a multiple porosity substrate 900. The multiple porosity substrate 900 comprises a permeable fiberglass, felt, fiber, polyester, or other polymer material 902 and an impermeable layer 904 created by a coating. A coating flows into the interstitial openings in the permeable layer 902 and creates an impermeable layer 904.

Figure 10:
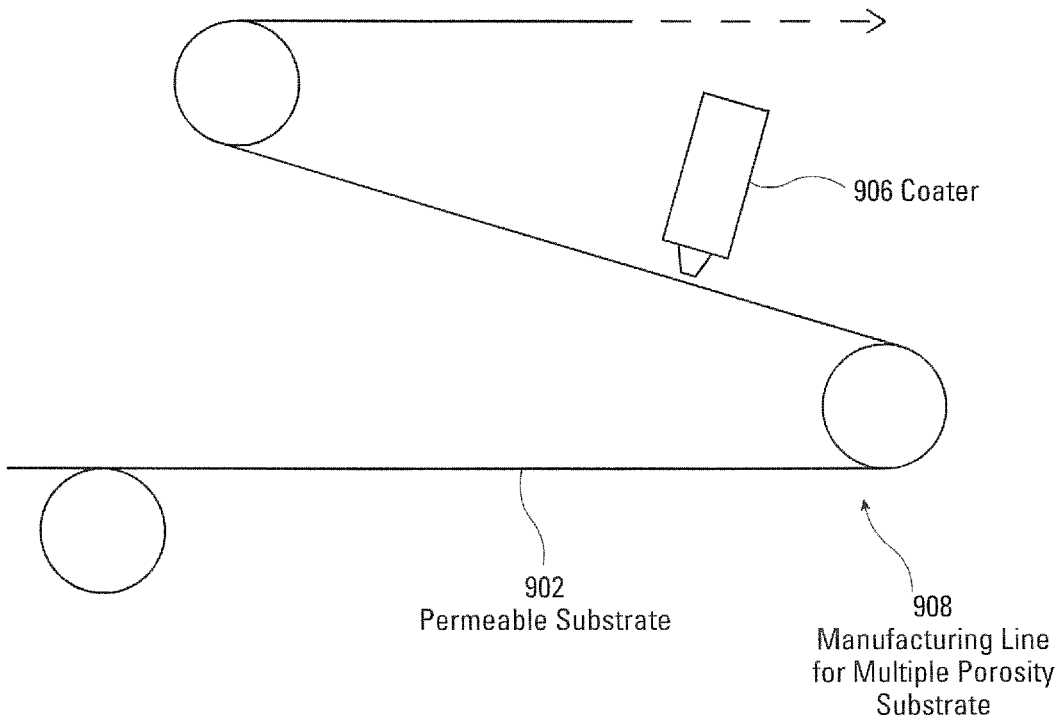
FIG. 10 is a schematic side view of a portion of a manufacturing line for implementation of the embodiment of FIG. 9.

FIG. 10 is a schematic side view of a manufacturing line 908 for the multiple porosity substrate 900 illustrated in FIG. 9. As shown in FIG. 10, the permeable substrate 902 is fed over rollers so that the bottom portion of the permeable substrate 902 is exposed to a coater 906. The coater 906 applies the coating to create the impermeable layer 904 on the bottom surface of the permeable substrate 902. For example, acrylic, urethane, silicone and numerous other similar materials, known to those skilled in the art, can be used. Hot melt adhesive, butyl rubber adhesive, polymer modified asphalt adhesive and similar coatings can also be used.

Figure 11:
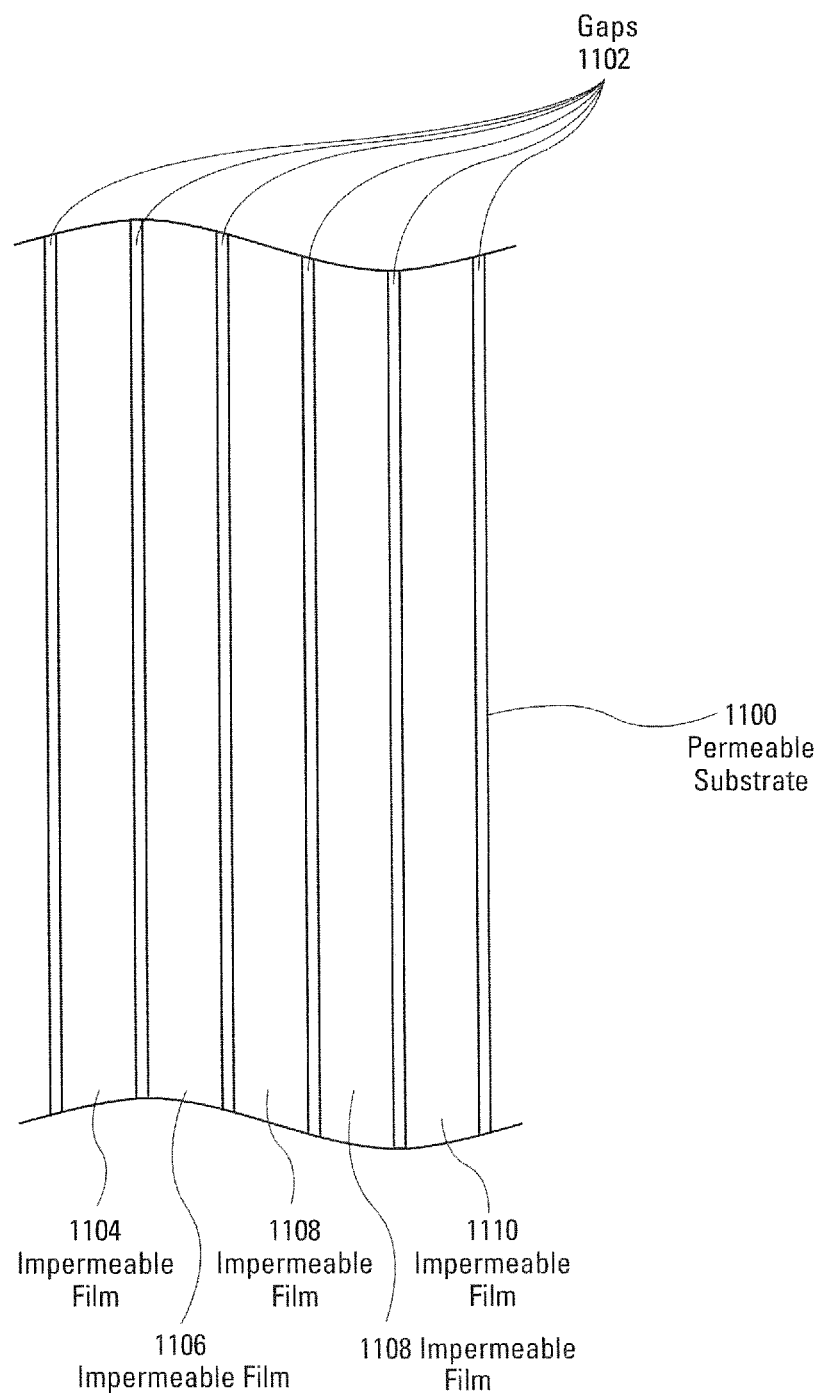
FIG. 11 is a schematic bottom view of a permeable substrate having impermeable film strips disposed on a bottom portion of said permeable substrate.

FIG. 11 is a bottom view of a permeable substrate 1100 having a plurality of impermeable film strips 1104, 1106, 1108, 1110 that are attached to the bottom surface of the permeable substrate 1100. The impermeable film strips 1104-1110 have gaps 1102 between them which allows asphalt to seep through the permeable substrate 1100 to coat the bottom surface of the permeable substrate 1100. In this manner, the bottom surface of the permeable substrate 1100 can be coated by using asphalt that is applied to just the top portion of the permeable substrate 1100. The amount of asphalt that seeps through the gaps 1102 is controlled by the size of the gaps. Of course, the impermeable film 1104-1110 can be formed in any desired shape and provide any desired number and size of gaps that are desired.

Figure 12:
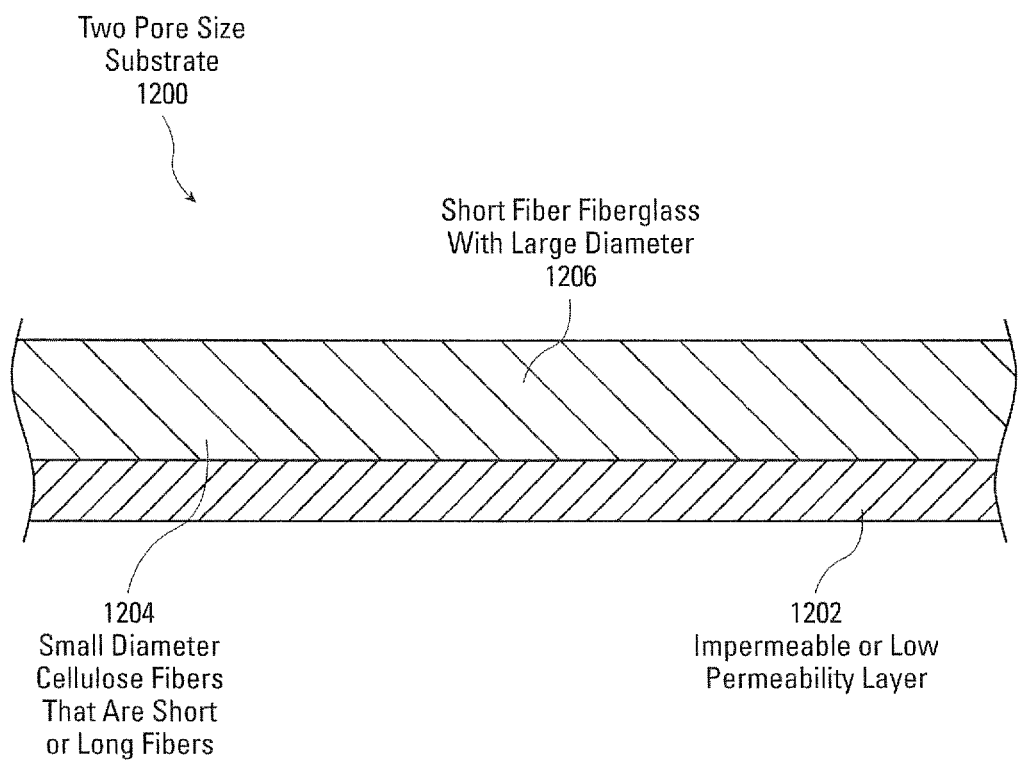
FIG. 12 is a schematic cross-sectional view of an embodiment of a two-pore sized substrate.

FIG. 12 is a schematic side cross-sectional view of a multiple pore size substrate 1200 that is attached to an impermeable or low permeability layer 1202. As illustrated in FIG. 12, short fiber fiberglass fibers having a large diameter 1206 form an upper layer of the two pore size substrate 1200. The middle layer is formed from small diameter cellulose fibers 1204 that are either short or long fibers. The upper layer 1206 is more porous than the middle layer 1204, while the bottom layer 1202 is impermeable or has very low permeability. Heated liquid asphalt can be applied to the top layer 1206 which soaks up the heated asphalt that flows through the layer 1206 to the layer 1204 and attaches to the impermeable layer 1202.

Figure 13:
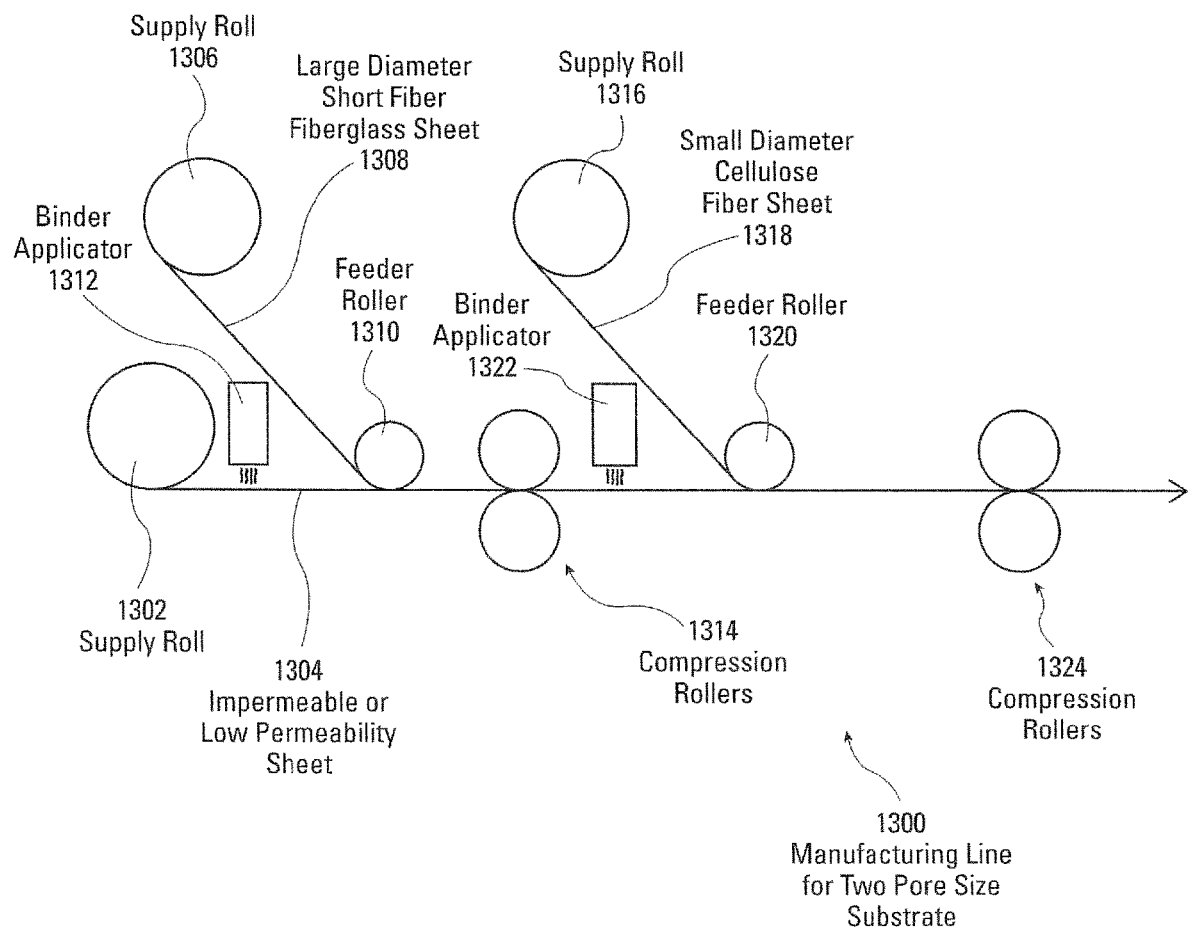
FIG. 13 is a schematic side view of a manufacturing line for a two-pore sized substrate.

FIG. 13 is a side schematic view of an embodiment of a manufacturing line 1300 for creating a multiple pore size substrate such as illustrated in FIG. 12. As shown in FIG. 13, a supply roll 1302 supplies an impermeable or low permeability sheet 1304 to the manufacturing line 1300. A binder applicator 1312 applies a binder to the impermeable or low permeable sheet 1304. Supply roll 1302 provides a large diameter short fiber fiberglass sheet 1308 to a feeder roller 1310 that places the large diameter short fiber fiberglass sheet 1308 over the top of the impermeable or low permeability sheet 1304. The combined sheets are then passed through compression rollers 1314 which cause the binder from the binder applicator 1312 to bind the large diameter short fiber fiberglass sheet 1308 to the impermeable or low permeability sheet 1304. The combined sheets are then passed through compression rollers 1314 to bond the layers together. Binder applicator 1322 applies binder to the top of the combined sheets. Supply roll 1316 supplies a small diameter cellulose fiber sheet 1318 to a feeder roller 1320. Feeder roller 1320 places the small diameter cellulose fiber sheet 1318 over the top of the combined sheets and the binders supplied by the binder applicator 1322. The combined sheets then proceed to the compression rollers 1324 which cause the binder from the binder applicator 1322 and the binder applicator 1312 to cause the sheets to binder together.

Figure 14:
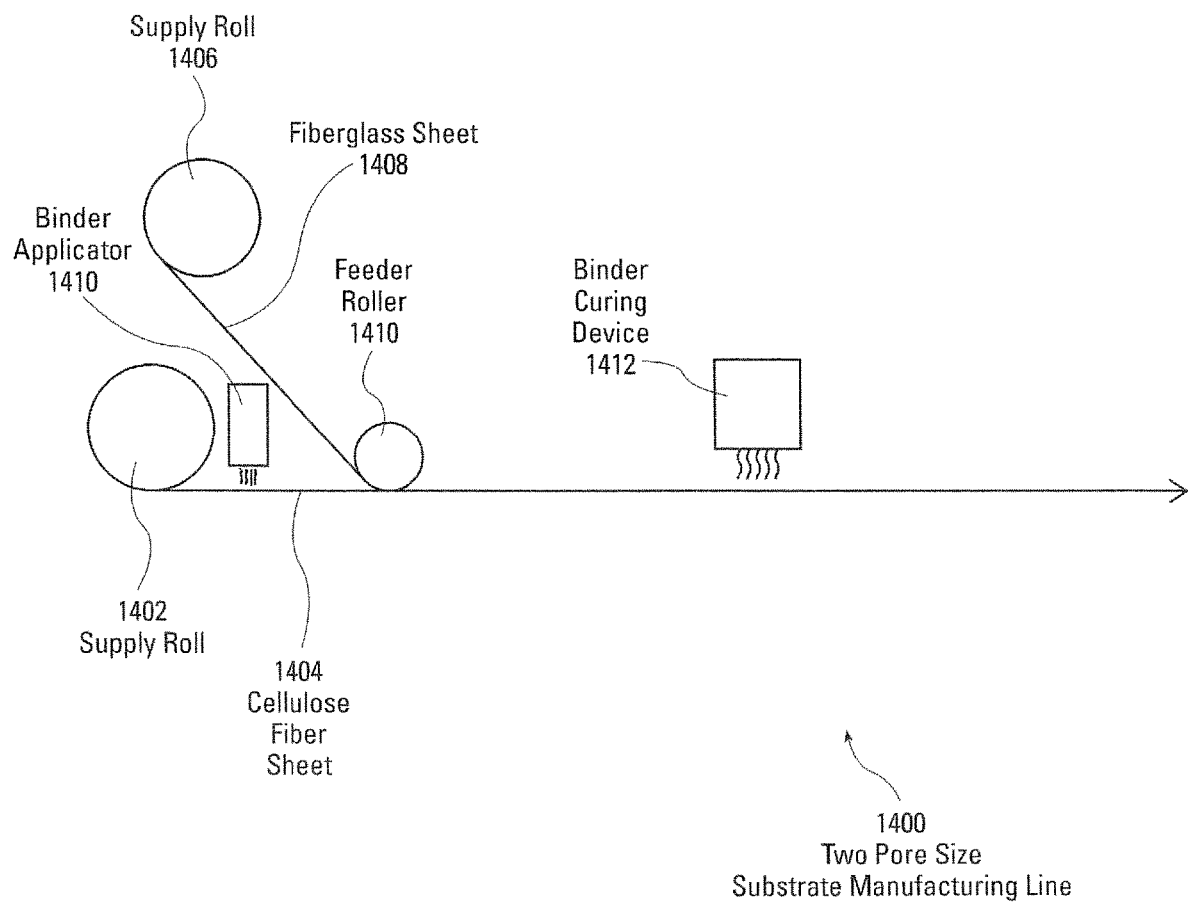
FIG. 14 is a schematic side view of an embodiment of a two-pore sized substrate manufacturing line.

FIG. 14 is a side schematic diagram of a two pore size substrate manufacturing line 1400. As illustrated in FIG. 14, a supply roll 1402 supplies a cellulose fiber sheet 1404 to a binding applicator 1410. The binding applicator 1410 provides a binder which may comprise a chemical binder or adhesive binder. Supply roll 1406 supplies a fiberglass sheet 1408 to feeder roller 1411 which places the fiberglass sheet 1408 over the cellulose fiber sheet 1404. A binder curing device 1412 is then used to cure the binder provided by binder applicator 1410. For example, binding curing device 1412 may provide UV light to cure a UV binder, an infrared light that heats the binder to cure the binder by heat, a hot air supply that cures the binder using heat or other techniques. The binding curing device 1412 may also produce high energy radio waves that induce heat to cure the binder provided by the binding applicator 1410.

Figure 15:
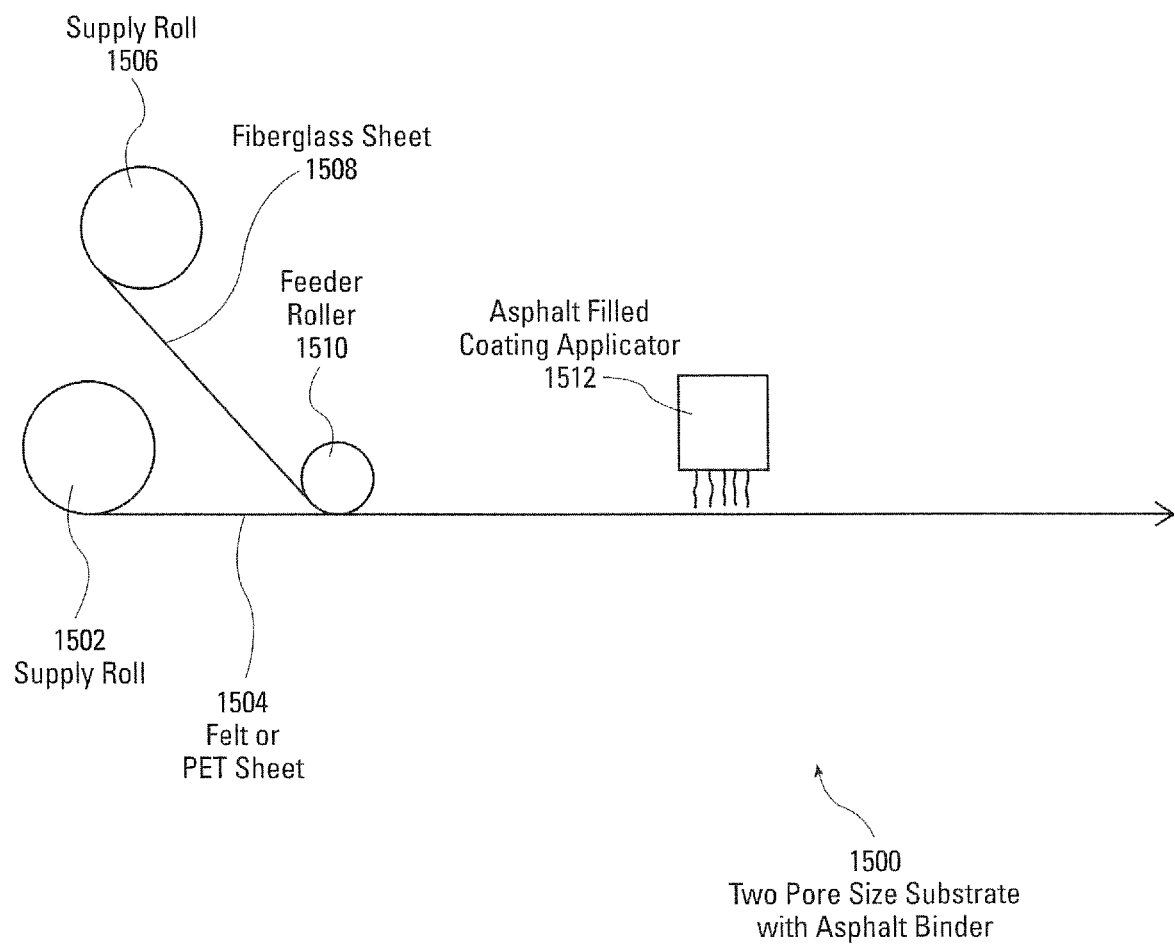
FIG. 15 is a schematic side view of an embodiment of a two-pore sized substrate using an asphalt binder.

FIG. 15 is a side schematic view of another embodiment of a manufacturing line 1500 for a two pore size substrate using asphalt as a binder. As illustrated in FIG. 15, a supply roll 1502 provides a felt or PET sheet 1504. Supply roll 1506 supplies a fiberglass sheet 1508 which is placed over the felt or PET sheet 1504 by feeder roller 1510. The combined sheets are then passed through an asphalt coating applicator 1512 which applies asphalt to the top layer, i.e. the fiberglass sheet 1508. The fiberglass sheet 1508 is permeable and allows the asphalt from the asphalt coating applicator 1512 to penetrate the fiberglass sheet 1508 and adhesively bind the fiberglass sheet 1508 to the felt or PET sheet 1504. In this manner, the asphalt from the asphalt coating applicator 1512 functions as an adhesive to bind the fiberglass sheet 1508 to the felt or PET sheet 1504.

Figure 16:
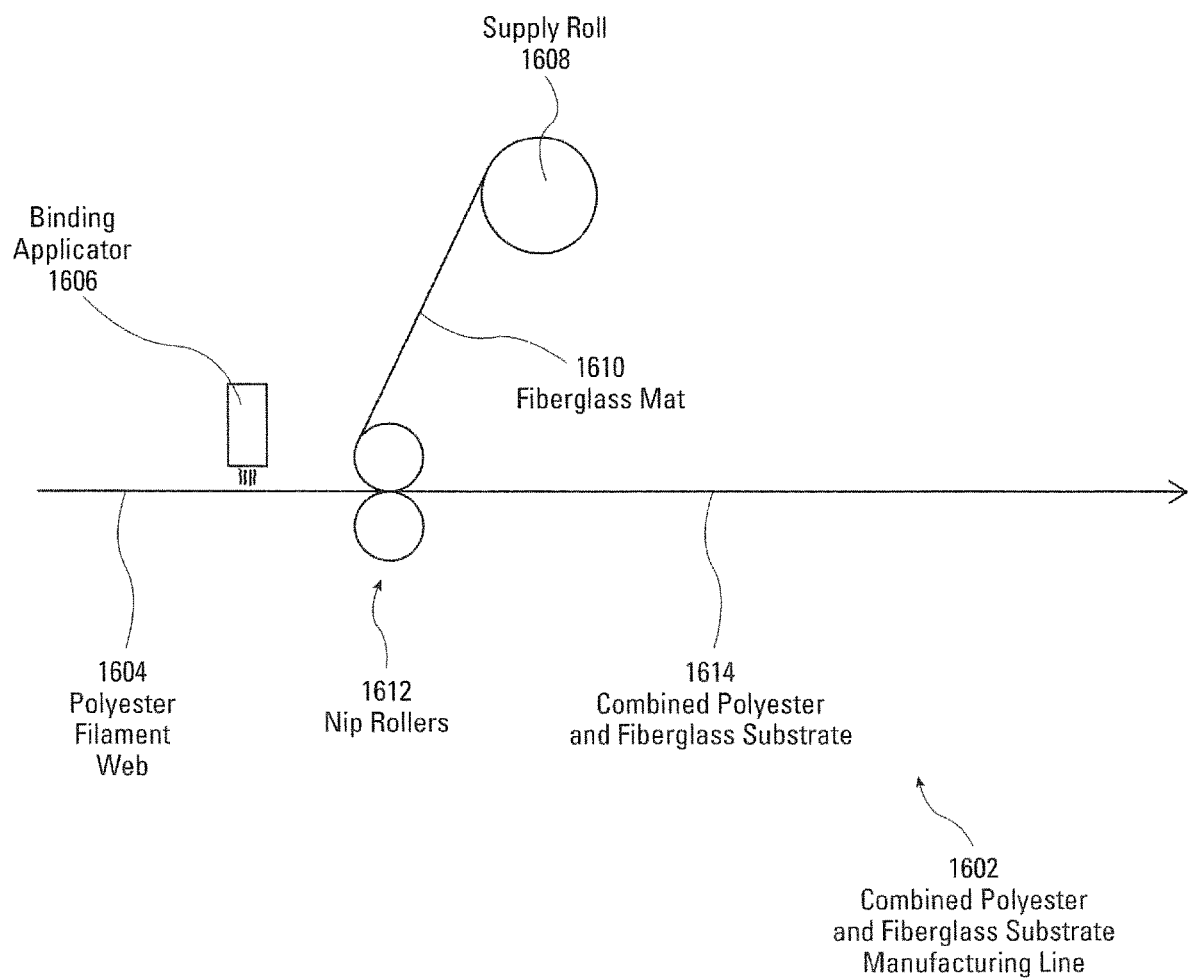
FIG. 16 is a schematic side view of a combined polyester and fiberglass substrate manufacturing line.

FIG. 16 is side schematic diagram of another embodiment of a manufacturing line 1602 for manufacturing a combined polyester and fiberglass substrate 1614. As illustrated in FIG. 16, a polyester filament web 1604, formed from extruded polyester fibers, is provided to the manufacturing line 1602. A binding applicator 1606 applies a binding agent to the polyester filament web 1604. A supply roll 1608 supplies a fiberglass mat 1610 to nip rollers 1612. The nip rollers place the fiberglass mat 1610 over the top portion of the polyester filament web 1604 so that the fiberglass mat 1610 is secured to the polyester filament web 1604 by the binder provided by the binder applicator 1606. In this fashion, a combined polyester and fiberglass substrate 1614 is created by the manufacturing line 1602.

Figure 17:
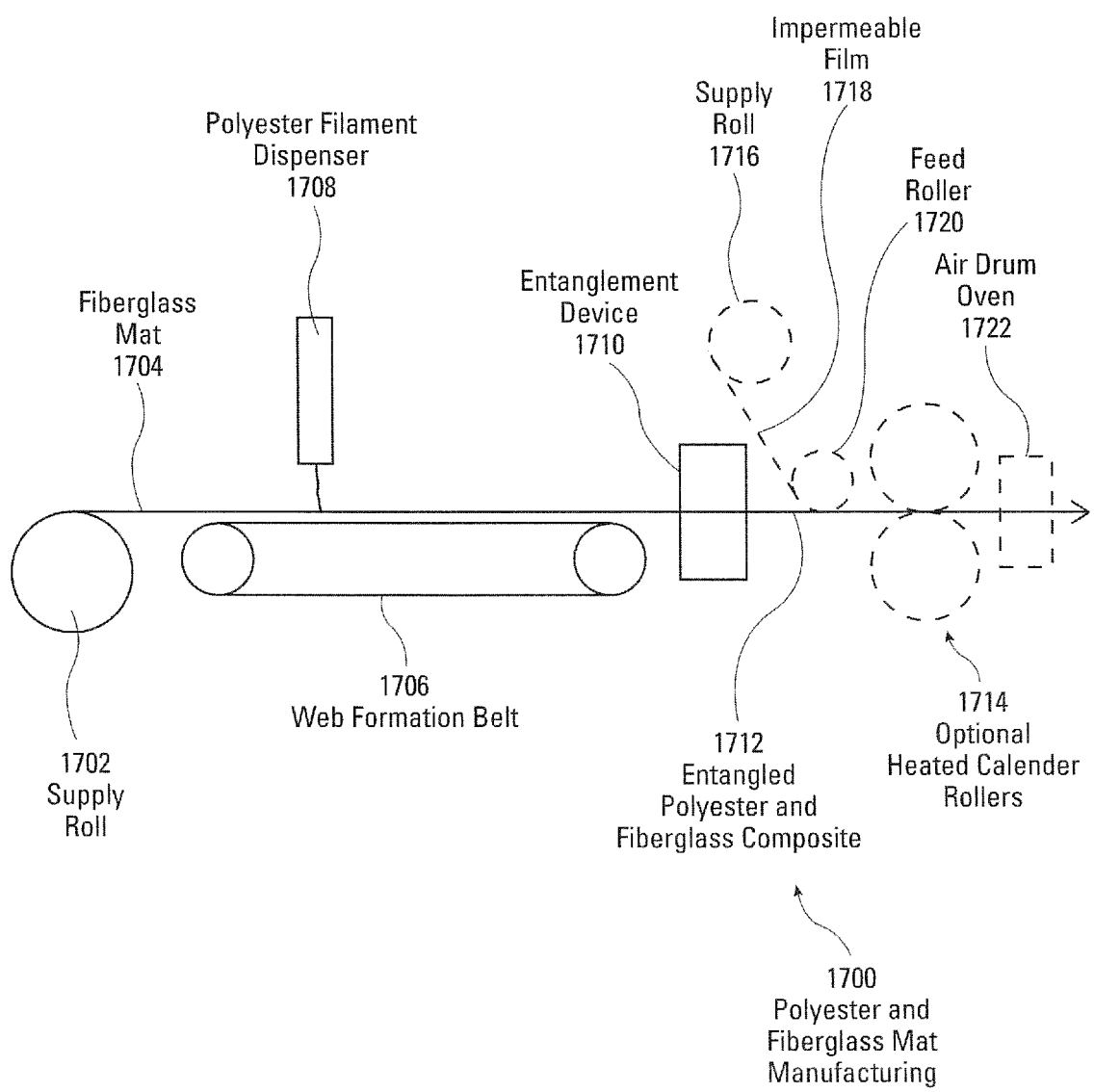
FIG. 17 is a schematic side view of a polyester and fiberglass manufacturing line.

FIG. 17 is a side schematic diagram of another embodiment of a manufacturing line 1700 for creating a polyester and fiberglass mat substrate. As illustrated in FIG. 17, supply roll 1702 provides a fiberglass mat 1704 to the manufacturing line 1700. The fiberglass mat 1704 is placed on a web formation belt 1708. A polyester filament dispenser 1706 is placed over the fiberglass mat 1704 and the web formation belt 1708 so that the polyester filaments from the polyester filament dispenser 1706 can be disbursed over the surface of the fiberglass mat 1704. The web formation belt 1708 transfers the fiberglass mat 1704 and the polyester filaments that are disbursed on the fiberglass mat 1704 to an entanglement device 1710. The entanglement device may include barbed needles that move up and down and cause the polyester filaments to become entangled with the fibers from the fiberglass mat 1704. The entanglement device may also use a hydroentanglement process in which the polyester filaments and fiberglass mat fibers are entangled using high pressure water jets. The entangled polyester fibers and fiberglass mat 1712 then proceeds to the optional heated calender rollers 1714. The entangled polyester fibers and fiberglass mat 1712 may provide a substrate for roofing material that has both top and bottom asphalt layers and is impact resistant because of the impact resistance of the polyester fibers. This is disclosed in more detail in U.S. Patent Application Ser. No. 62/628,141 filed Feb. 8, 2018 by David Humphreys entitled "Polymat Shingle," which is specifically incorporated herein by references for all that it discloses and teaches. The entangled polyester/fiberglass composite 1712 is fed to the optional heated calender roller 1714 which soften the polyester filaments so that the polyester filaments bond with the fiberglass fibers of the fiberglass mat 1704. In this manner, the entangled polyester and fiberglass composite 1712 is bound together. Another way of bonding the entangled polyester/fiberglass composite 1712, instead of using the optional heated calender roller 1714, is to use an air drum oven 1722. The air drum oven 1722 causes heated air to pass through the entangled polyester/fiberglass composite 1712 as it is passed over a perforated oven drum. Bonding may preferably be controlled by the airflow, temperature and dwell time of the composite in the oven. Air drum ovens can be obtained from American Truetzschler Inc., 12300 Moores Chapel Road, Charlotte, N.C. 28214.

In some instances, the entangled polyester and fiberglass mat may be used as a substrate for asphalt roofing without further bonding. A supply roll 1716 can optionally be used, which provides an impermeable film 1718 via a feed roller 1720. The impermeable film 1718 is placed over the fiberglass mat 1704 and provides an impermeable layer on the bottom surface of the entangled polyester and fiberglass composite 1712, so that heated, liquid asphalt does not flow through the composite when the heated, liquid asphalt is poured over the top of the substrate. Although the impermeable film 1718 is shown as being applied to the top of the composite layers and on the fiberglass mat 1704, the impermeable film 1718 can also be applied to the bottom composite layer, as illustrated in FIG. 18, or the substrate can be turned over during manufacturing so that asphalt is applied to what is shown as the bottom of the substrate in FIG. 17, which is on the top when the substrate is turned over.

Figure 18:
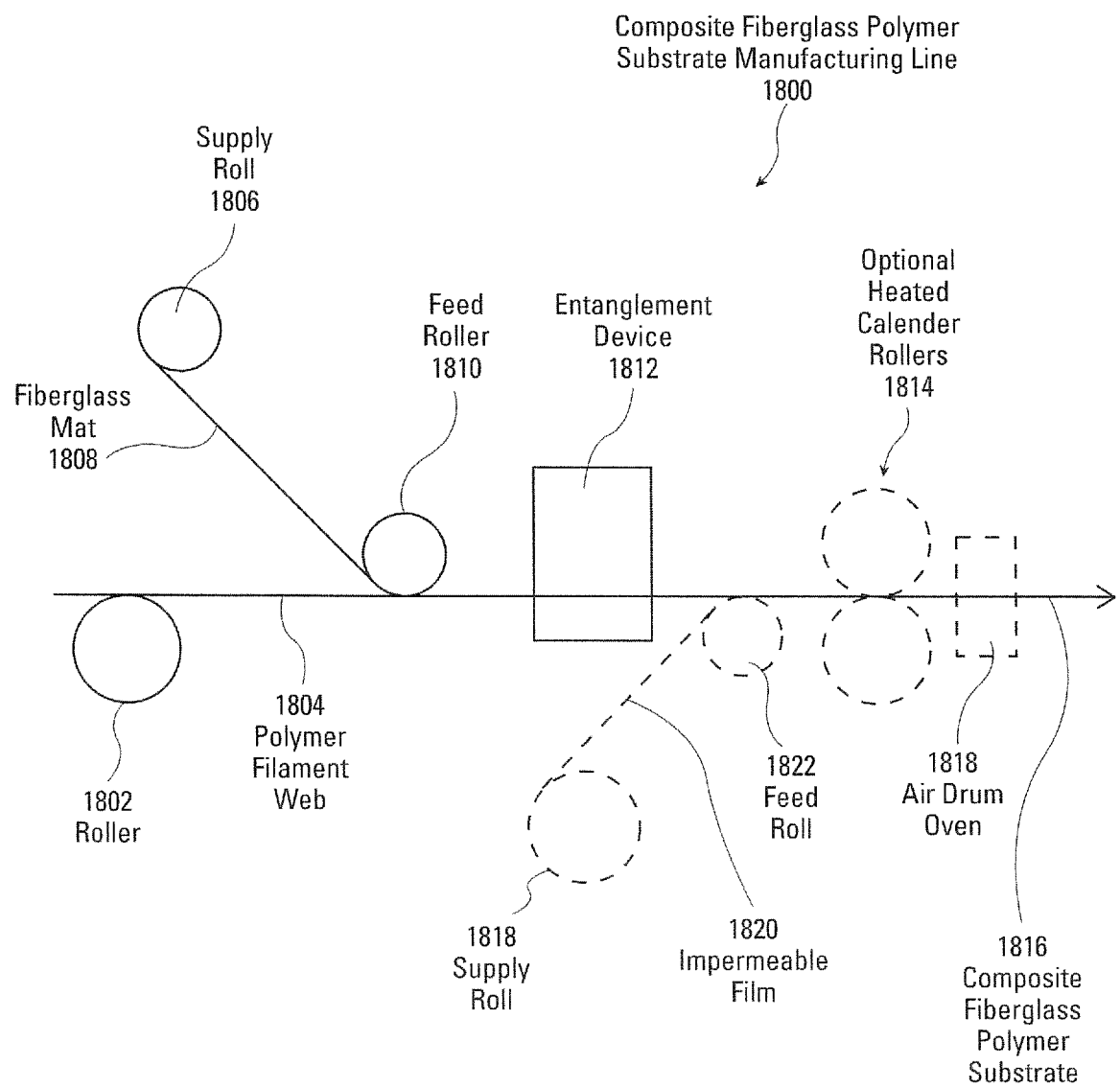
FIG. 18 is a schematic side view of a composite fiberglass polymer substrate manufacturing line.

FIG. 18 is a schematic side diagram of a composite fiberglass polymer substrate manufacturing line 1800. As illustrated in FIG. 18, a roller 1802 provides a polymer filament web 1804 to the manufacturing line 1800. Simultaneously, supply roll 1806 supplies a fiberglass mat 1808 to a feed roller 1810. The fiberglass mat 1808 has a plurality of glass fibers that form the fiberglass mat 1808. The feed roller 1810 places the fiberglass mat 1808 over the polymer filament web 1804 so that the fiberglass mat 1808 is aligned with the polymer filament web 1804. The fiberglass mat 1808 and the polymer filament web 1804 are then fed to an entanglement device 1812. The entanglement device 1812 may comprise a needling device that has a multitude of barbed needles that engage both the filaments of the polymer filament web and the fibers of the fiberglass mat 1808 so that the fiberglass mat 1808 and the polymer filament web 1804 become entangled with one another. The entanglement device may also use a hydroentanglement process in which the polyester filaments and fiberglass mat fibers are entangled using high pressure water jets. The entangled web and mat can then, optionally, be fed to heated calender rollers 1814 that both compress and heat the entangled web and mat to create a composite fiberglass polymer substrate 1816. Hydroentanglement devices are available from American Truetzschler Inc., 12300 Moores Chapel Road, Charlotte, N.C. 28214. In some instances, it is not necessary to use the heated calender rollers 1814 and the combined entangled fiberglass mat and polymer filament web can be used as a substrate for asphalt roofing, without further bonding. The optional heated calender rollers 1814 apply sufficient heat and pressure to soften the polymer filaments in the polymer filament web 1804 so that the polymer filaments bond to the fiberglass fibers to form the composite fiberglass polymer substrate.

Another way of bonding the entangled polyester/fiberglass composite 1712, instead of using the optional heated calender roller 1814, is to use an air drum oven 1818. The air drum oven 1818 causes heated air to pass through the entangled polyester/fiberglass composite 1712 as it is passed over a perforated oven drum. Bonding may preferably be controlled by the airflow, temperature and dwell time of the composite in the oven. Air drum ovens can be obtained from American Truetzschler Inc., 12300 Moores Chapel Road, Charlotte, N.C. 28214. The fiberglass/polymer substrate 1816 is porous and will absorb asphalt placed on the surface of the composite fiberglass polymer substrate 1816 by flowing into the interstitial openings in the fiberglass/polymer substrate 1816, and has the advantage of providing impact resistance to the roofing material. The fibers of a standard fiberglass substrate in roofing material can break and crack when impacted, such as an impact from a hail stone. This weakens the integrity of the roofing material. The addition of the polymer filaments reduces the cracking and breaking of the fiberglass fibers since the polymer layers are able to absorb the impacts without breaking. Various types of polymers can be used in this process, as set forth above, including polypropylene. Polyester is the preferred polymer and can be extruded into very fine filaments that can be entangled easily with the fiberglass fibers. As mentioned above, various polymer-based substrates can be used, such as polypropylene and polyethylene, as well as other polymer substrate materials, especially those that can be extruded into fine, flexible fibers. FIG. 18 also illustrates a supply roll 1818 that can optionally supply an impermeable film 1820 via the feed roll 1822. The entangled polymer filament web and fiberglass mat 1808, as well as the impermeable film 1820, can then be fed to the heated calender rollers 1814 to produce a composite fiberglass polymer substrate 1816. With the optional impermeable film 1820, the composite fiberglass polymer substrate provides a substrate that does not allow hot liquid asphalt to flow through to the bottom surface of the substrate. The various advantages of such a substrate are disclosed above.

Figure 19:
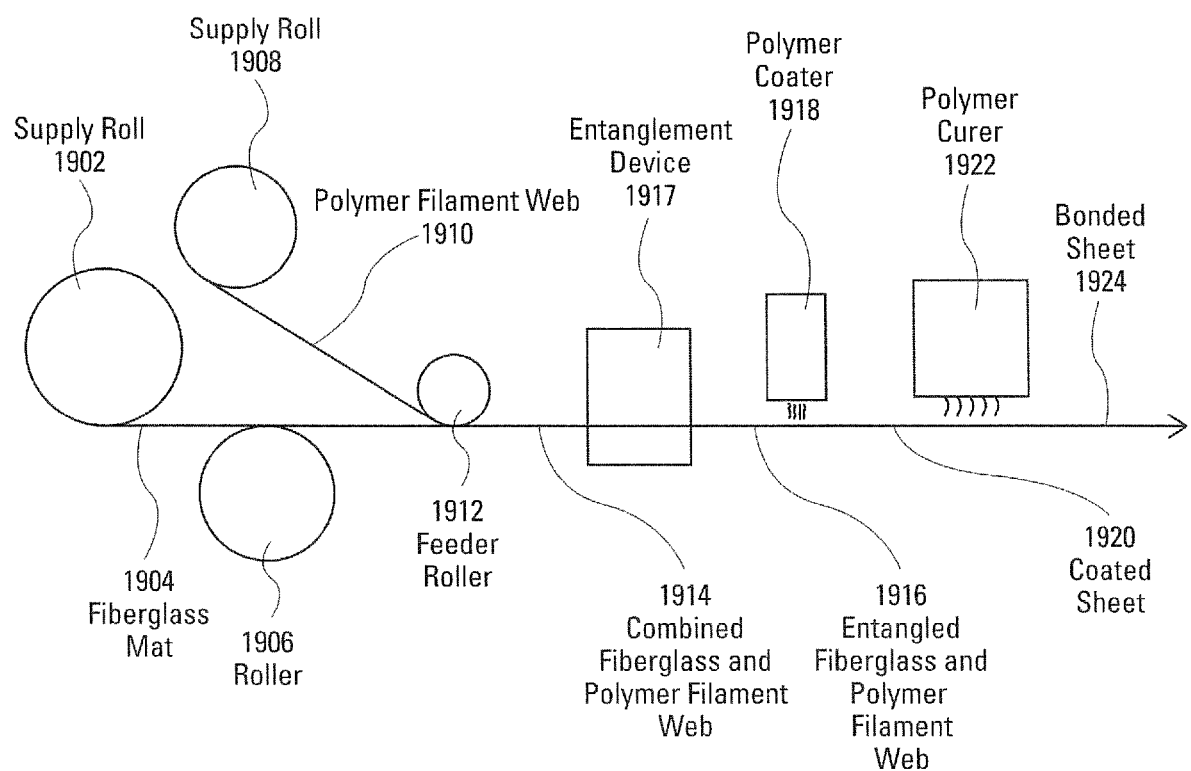
FIG. 19 is a schematic side view illustrating another embodiment of an apparatus for making a multi-layer substrate.

FIG. 19 is a schematic side view illustrating another embodiment of an apparatus for making a multi-layer substrate. As illustrated in FIG. 19, a supply roll 1902 supplies a fiberglass mat 1904 to a roller 1906 that moves the fiberglass mat 1904 into the manufacturing process illustrated in FIG. 19. A supply roll 1908 supplies a polymer filament web 1910 that comprise a plurality of entangled polymer filaments. The polymer filaments may comprise polyester polymer filaments or other polymer filaments, such as indicated above. Feeder roller 1912 places the polymer filament web 1910 over the fiberglass mat 1904. The combined fiberglass and polymer filament web 1914 are then moved to an entanglement device 1916 that entangles the polymer filaments with the fibers of the fiberglass mat 1904 to create the entangled fiberglass and polymer filament web 1916. The entangled fiberglass and polymer filament web 1916 is then passed under a polymer coater 1918 which places a polymer coating on the entangled fiberglass and polymer filament web 1916 to create a coated sheet 1920. The coated sheet 1920 is then passed under a polymer curing device 1922 that cures the polymer coating in the coated sheet 1920. The polymer curer 1922 may comprise a radiant heater, a hot air blower, a UV curing device or other curing device for curing the polymer coating on the coated sheet 1920. When the polymer coating is cured, a bonded sheet 1924 of substrate material is created.

Figure 20:
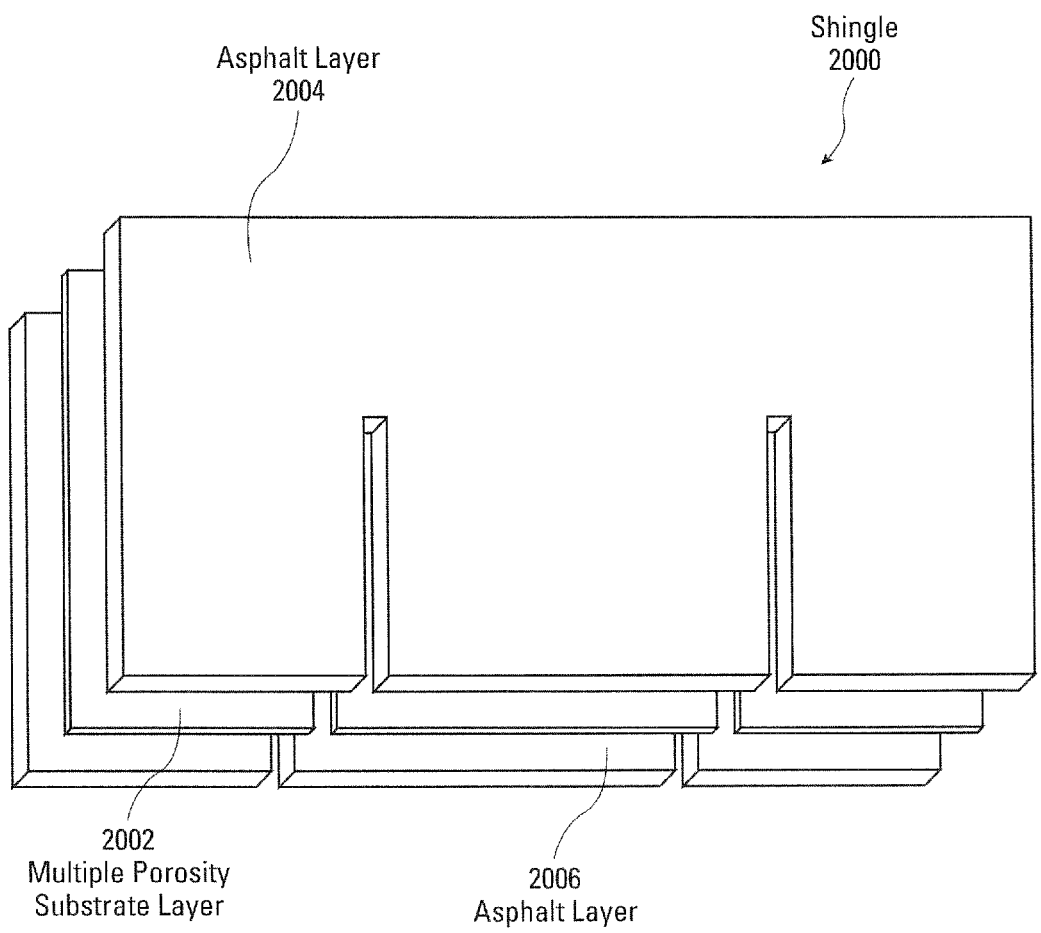
FIG. 20 is a schematic perspective view of a shingle that may incorporate the unique multi-porosity substrates of the present invention.

FIG. 20 is a schematic perspective view of a shingle 2000 that may incorporate the unique multi-porosity substrates of the present invention. As illustrated in FIG. 20, the shingle 2000 has a substrate layer 2002 that constitutes one of the various embodiments of the multiple porosity substrates disclosed herein. The substrate layer 2002 is covered on a top portion by an asphalt layer 2004 and a bottom asphalt layer 2006. The asphalt layer 2004 includes granules on exposed portions of the shingle 2000 and fines on non-exposed portions, such as the headlap region, when the shingle is installed on roofing. The back of the asphalt layer 2006 may include fines and adhesive layers, which are typical for standard asphalt roofing shingles.

Figure 21:
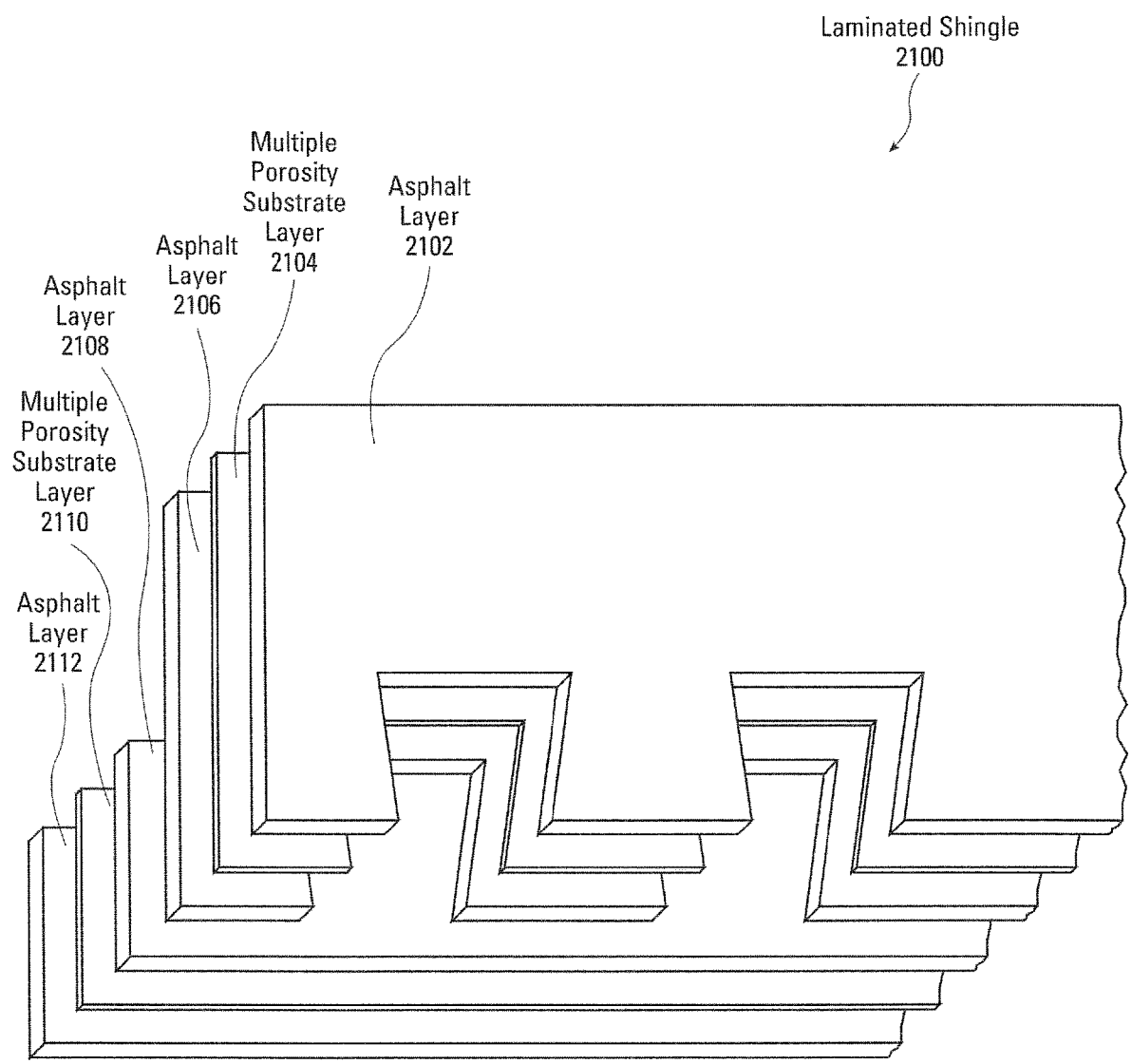
FIG. 21 is a schematic perspective view of a laminated shingle that utilizes the unique multiple porosity substrates in accordance with the various embodiments disclosed herein.

FIG. 21 is a schematic perspective view of a laminated shingle 2100 that utilizes the unique multiple porosity substrates in accordance with the various embodiments disclosed herein. As illustrated in FIG. 21, an asphalt layer 2102 is disposed on a substrate layer 2104. The substrate layer 2104 may comprise any one of the multiple porosity substrates disclosed herein. Asphalt layer 2106 covers a bottom portion of the substrate layer 2104. The bottom portion of the shingle 2100 comprises asphalt layers 2108, 2112 that cover the substrate layer 2110 so that the substrate layer 2110 is embedded between the asphalt layers 2108, 2112. Again, the substrate layer 2110 may comprise any one of the various embodiments of the multiple porosity substrates disclosed herein, which would result in impact resistant shingles that maintain the structural integrity through impact incidences such as hail storms.

Figure 22:
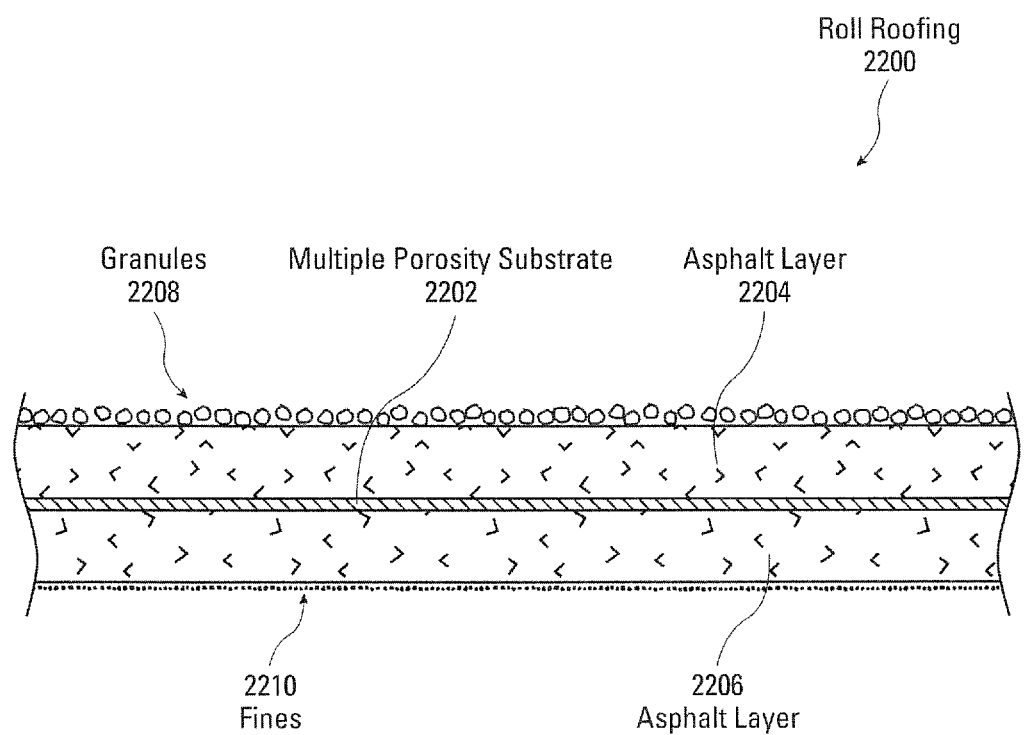
FIG. 22 is a side view of a roll roofing product.

FIG. 22 is a side view of a roll roofing product 2200. The roll roofing 2200 has a multiple porosity substrate 2202 that can comprise any one of the various embodiments disclosed herein. An asphalt layer 2204 is disposed on the top surface of the substrate 2202 and an asphalt layer 2206 is disposed on a bottom surface of the substrate 2202. Granules 2208 are attached to the top of asphalt layer 2204. Fines 2210 are attached to the bottom surface of the asphalt layer 2206. The roll roofing 2200 is similar to other roll roofing products with the exception that roll roofing 2200 includes the multiple porosity substrate 2202 that provides structural integrity and impact resistance to roll roofing 2200.

Figure 23:
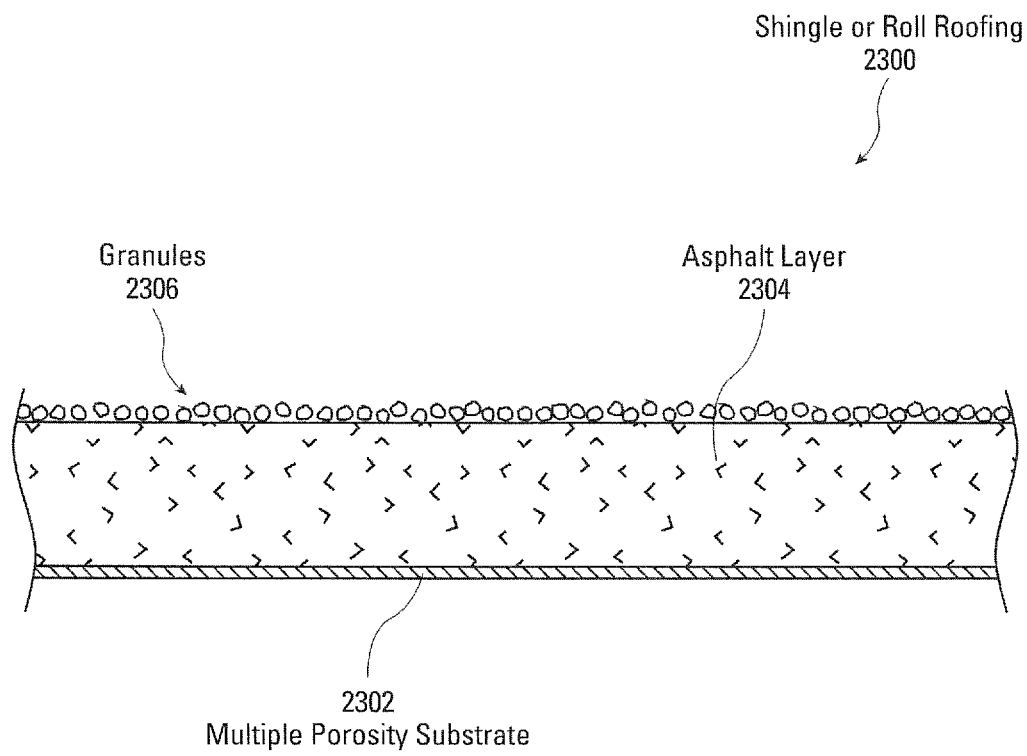
FIG. 23 is a cross-sectional view of a shingle or roll roofing product that utilizes a multiple porosity substrate that has an impermeable bottom surface.

FIG. 23 is a cross-sectional view of a shingle or roll roofing product 2300 that utilizes a multiple porosity substrate 2302 that has an impermeable bottom surface. The multiple porosity substrate 2302 has a liquid impermeable bottom surface that does not require a bottom asphalt layer. For example, the embodiments disclosed in FIGS. 1A, 2, 3, 4, 5, 7, 9, and 12 can have an impermeable bottom surface and asphalt can be applied to the top surface only. This greatly reduces the complexity and cost of the shingle or roll roofing 2300 and allows for less complex techniques for making the shingle or roll roofing 2300. As illustrated in FIG. 23, the asphalt layer 2304 can be applied over the multiple porosity substrate 2302 from the top surface of the multiple porosity substrate 2302. Granules 2306 can then be applied to the top of the asphalt layer 2304 of the shingle or roll roofing 2300.

Figure 24:
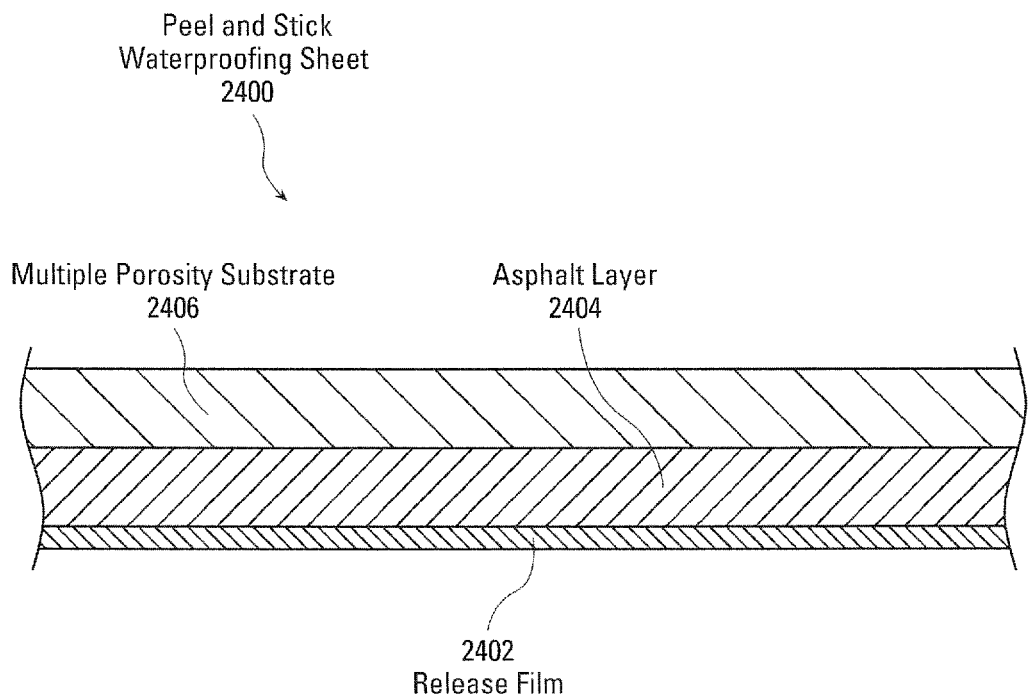
FIG. 24 is a schematic cross-sectional view of a peel and stick type of waterproofing sheet.

FIG. 24 is a schematic cross-sectional view of a peel and stick type of waterproofing sheet 2400. Again, the peel and stick type of waterproofing sheet 2400 uses a multiple porosity substrate 2406 that has an impermeable bottom surface. Again, any one of the embodiments illustrated in FIGS. 1A, 2, 3, 4, 5, 7, 9, and 12 can be utilized as a multiple porosity substrate 2406 with those embodiments having a liquid impermeable bottom or outer surface. The asphalt layer 2404 is deposited as a liquid on the top surface of the multiple porosity substrate 2406 and bonds to the multiple porosity substrate 2406, since the hot liquid asphalt flows into the interstitial openings on the upper portion of the multiple porosity substrate 2406, cools and solidifies to form a strong bond between the asphalt layer 2404 and the multiple porosity substrate 2406. A release film 2402 is then applied to the exposed surface of the asphalt layer 2404. The release film is removed when the peel and stick waterproofing sheet 2400 is applied to a surface such as a foundation surface, roofing surface, wall surface, etc.

Consequently, the various embodiments of the present invention provide various types of substrates that can be utilized in roofing material that has a single top asphalt applicator or that may be used as a substrate for standard roofing materials. Multiple porosity layers can be used that allow the top coating asphalt to penetrate the substrate without requiring a bottom asphalt applicator. Resulting shingles, waterproofing materials and roll goods can be packaged without applying fines to the bottom surface to prevent shingles from sticking together in the package or in a roofing embodiment. Non-permeable bottom layers can be used to prevent top applied asphalt from flowing through to the bottom surface. If it is desirable to have the top coating of asphalt flow through to the bottom surface, a semi-permeable layer can be used as a bottom layer of the substrate, or an impermeable layer can be used that has perforations or impermeable strips with gaps to control the amount of asphalt that flows through to the bottom surface. Polyester filaments can also be combined with a fiberglass sheet and entangled to create a combined polyester and fiberglass substrate that can be used to create an impact resistant shingle. These substrates can also be thermobonded using a perforated air drum roller or through the use of a polymeric coating, as described above.

What is claimed is:

1. A laminated multiple layer composite sheet of substrate material for use in asphalt waterproofing products comprising:
    a first sheet of substrate material having a first porosity;
    a second sheet of substrate material having a second porosity that is less than said first porosity;
    a third sheet of substrate material having a third porosity that is less than said first porosity and said second porosity;
    a first bonding agent that is disposed between said first sheet of substrate material and said second sheet of substrate material that bonds said first sheet of substrate material directly to said second sheet of substrate material, said first sheet of substrate material disposed adjacent to said second sheet of substrate material so that said first sheet of substrate material is in contact with said second sheet of substrate material;
    a second bonding agent that is disposed between said second sheet of substrate material and said third sheet of substrate material that bonds said second sheet of substrate material directly to said third sheet of substrate material, said second sheet of substrate material disposed adjacent to said third sheet of substrate material so that said second sheet of substrate material is in contact with said third sheet of substrate material, said first sheet of substrate material, said second sheet of substrate material, and said third sheet of substrate material thereby forming said laminated multiple layer composite.

2. The multiple layer sheet of claim 1 wherein said first sheet of substrate material is a low permeability layer, said second sheet of substrate material is cellulose fiber and said third sheet of substrate material is fiberglass.

3. The multiple layer sheet of claim 1 wherein said first sheet of substrate material is a low permeability layer, said second sheet of substrate material is felt and said third sheet of substrate material is fiberglass.

4. The multiple layer sheet of claim 1 wherein said first sheet of substrate material is a low permeability layer, said second sheet of substrate material is PET and said third sheet of substrate material is fiberglass.

5. The multiple layer sheet of claim 1 wherein said first sheet of substrate material is a low permeability layer, said second sheet of substrate material is a polyester filament web and said third sheet of substrate material is fiberglass.

6. The multiple layer sheet of claim 1 wherein said third sheet of substrate material is a liquid impermeable layer attached directly to said second sheet of substrate material.

7. A waterproofing material that is impact resistant comprising:
    a first layer of substrate material having a first porosity;
    a second layer of substrate material that is bonded directly to said first layer of substrate material so that said first layer of substrate material contacts said second layer of substrate material, said second layer of substrate material having a second porosity that is less than said first porosity;
    a third layer of substrate material that is bonded directly to said second layer of substrate material so that said second layer of substrate material contacts said third layer of substrate material to form a multiple layer composite substrate, said third layer of substrate material having a third porosity that is less than said first porosity and said second porosity;
    a first layer of asphalt that covers said first layer of substrate material.

8. The waterproofing material of claim 7 wherein said waterproofing material comprises shingles and further comprises:
    a second layer of asphalt that covers said third layer of substrate material.

9. The waterproofing material of claim 7 wherein said waterproofing material comprises roll roofing.

10. The waterproofing material of claim 7 wherein said waterproofing material comprises waterproofing products.

11. The waterproofing material of claim 7 wherein said waterproofing products comprise peel and stick waterproofing products.

12. The waterproofing materials of claim 7 further comprising:
   a bonding agent that bonds said first layer of substrate material to said second layer of substrate material and bonds said second layer to substrate material to said third layer of substrate material.

13. The waterproofing material of claim 7 wherein said first layer of asphalt penetrates said second layer of substrate material to said first layer of substrate material so that said first layer of asphalt is attached to said first layer of substrate by asphalt from said first layer of asphalt.

14. The waterproofing material of claim 7 wherein said first layer of substrate material is liquid impermeable.

15. The waterproofing material of claim 13 wherein said first layer of substrate material is liquid impermeable.

16. A waterproofing material that is impact resistant comprising:
   a first layer of substrate material that is liquid permeable;
   a second layer of substrate material that is liquid permeable and is disposed on said first layer of substrate material so that said first layer of substrate material contacts said second layer of substrate material;
   a third layer of substrate material that is liquid impermeable;
   liquid asphalt that is placed on said first layer of substrate material so that said liquid asphalt penetrates said first layer of substrate material and said second layer of substrate material to said third layer of substrate material and is allowed to cool to bond said third layer of substrate material to said second layer of substrate material and to bond said second layer of substrate material to said first layer of substrate material to form a layer of asphalt that is attached to said first layer of substrate material, said second layer of substrate material and said third layer of substrate material.

17. The waterproofing material of claim 16 wherein said waterproofing material comprises shingles.

18. The waterproofing material of claim 16 wherein said waterproofing material comprises roll roofing.

19. The waterproofing material of claim 16 wherein said waterproofing material comprises waterproofing products.

20. The waterproofing material of claim 19 wherein said waterproofing products comprise membrane waterproofing products.

21. The substrate material of claim 1 wherein said first layer of substrate material is fiberglass.

* * * * *

UNITED STATES PATENT AND TRADEMARK OFFICE
CERTIFICATE OF CORRECTION

PATENT NO. : 10,982,441 B2  
APPLICATION NO. : 16/290874  
DATED : April 20, 2021  
INVENTOR(S) : Cyril Chevillard, Aaron R. Phillips and James Gregory Powell Page 1 of 1

It is certified that error appears in the above-identified patent and that said Letters Patent is hereby corrected as shown below:

On the Title Page

Item (73) The Assignee should be corrected from "TAMKO Building Products, LLC" to "TAMKO Building Products LLC"

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*